United States Patent
Kim et al.

(10) Patent No.: US 11,598,537 B2
(45) Date of Patent: Mar. 7, 2023

(54) AIR PURIFIER

(71) Applicant: LG Electronics Inc., Seoul (KR)

(72) Inventors: Sukchun Kim, Seoul (KR); Myungjin Ku, Seoul (KR); Taeyoon Kim, Seoul (KR); Kunyoung Lee, Seoul (KR); Sangkyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 16/253,813

(22) Filed: Jan. 22, 2019

(65) Prior Publication Data
US 2019/0226698 A1    Jul. 25, 2019

(30) Foreign Application Priority Data

Jan. 19, 2018  (KR) .................. 10-2018-0007385
Feb. 19, 2018  (KR) .................. 10-2018-0019440
Jul. 27, 2018  (KR) .................. 10-2018-0087983
Nov. 1, 2018   (KR) .................. 10-2018-0133162

(51) Int. Cl.
| | |
|---|---|
| F24F 13/00 | (2006.01) |
| F24F 6/12 | (2006.01) |
| F24F 13/28 | (2006.01) |
| F24F 11/52 | (2018.01) |
| F24F 13/20 | (2006.01) |
| F24F 6/00 | (2006.01) |

(52) U.S. Cl.
CPC ............... *F24F 6/12* (2013.01); *F24F 11/52* (2018.01); *F24F 13/20* (2013.01); *F24F 13/28* (2013.01); *F24F 2006/008* (2013.01); *F24F 2221/36* (2013.01)

(58) Field of Classification Search
CPC .. F24F 11/52; F24F 2006/008; F24F 2221/36; F24F 13/20; F24F 13/28
USPC ......................................................... 96/294
See application file for complete search history.

(56) References Cited

U.S. PATENT DOCUMENTS

| | | | |
|---|---|---|---|
| 3,610,589 A | 10/1971 | Paulin | |
| 3,616,624 A * | 11/1971 | Marsh | F24F 3/163 |
| | | | 55/472 |
| 4,234,526 A | 11/1980 | Mackay | |
| 4,737,173 A | 4/1988 | Kudirka | |
| 4,753,496 A | 6/1988 | Bussard | |

(Continued)

FOREIGN PATENT DOCUMENTS

| | | |
|---|---|---|
| CN | 203274184 | 11/2013 |
| CN | 204519811 | 8/2015 |

(Continued)

OTHER PUBLICATIONS

Indian Office Action dated Jun. 30, 2020.

(Continued)

*Primary Examiner* — T. Bennett McKenzie
(74) *Attorney, Agent, or Firm* — Birch, Stewart, Kolasch & Birch, LLP

(57) ABSTRACT

An air purifier includes a display mounted between a front panel of a cabinet of the air purifier and an upper panel of the cabinet. The front panel includes a door which is configured and supported to be drawn in to the cabinet toward the display or drawn out from the cabinet away from the display. A display module including the display is disposed below the upper panel.

13 Claims, 31 Drawing Sheets

(56) References Cited

U.S. PATENT DOCUMENTS

| | | | |
|---|---|---|---|
| 4,953,991 A | 9/1990 | Rock | |
| 5,676,438 A * | 10/1997 | Jeong | F24F 1/027 |
| | | | 174/51 |
| 5,893,939 A | 4/1999 | Rakocy et al. | |
| 6,705,535 B1 | 3/2004 | Morton | |
| 2005/0258331 A1 | 11/2005 | Chi | |
| 2006/0016337 A1 | 1/2006 | Taylor et al. | |
| 2006/0021359 A1 * | 2/2006 | Hur | F24F 13/20 |
| | | | 62/126 |
| 2006/0278084 A1 * | 12/2006 | Kim | F24F 13/222 |
| | | | 96/140 |
| 2009/0096118 A1 | 4/2009 | Brown | |
| 2010/0143125 A1 | 6/2010 | Vogel et al. | |
| 2011/0291305 A1 * | 12/2011 | Choi | F24F 13/20 |
| | | | 261/30 |
| 2012/0164935 A1 | 6/2012 | Ha et al. | |
| 2013/0206009 A1 | 8/2013 | Huang et al. | |
| 2013/0222672 A1 * | 8/2013 | Kim | G06V 20/20 |
| | | | 348/333.11 |
| 2013/0235518 A1 | 9/2013 | Kuo et al. | |
| 2015/0084215 A1 | 3/2015 | Ojeda | |
| 2015/0125292 A1 | 5/2015 | Karst et al. | |
| 2015/0292508 A1 | 10/2015 | Ikeda et al. | |
| 2016/0010882 A1 * | 1/2016 | Lee | F24F 13/20 |
| | | | 312/236 |
| 2016/0052095 A1 | 2/2016 | Simmons | |
| 2016/0212874 A1 * | 7/2016 | Ogawa | B62J 11/00 |
| 2017/0122594 A1 | 5/2017 | Lee et al. | |
| 2018/0187908 A1 | 7/2018 | Brendel | |
| 2019/0072293 A1 | 3/2019 | Kim et al. | |

FOREIGN PATENT DOCUMENTS

| | | |
|---|---|---|
| JP | H07120006 | 5/1995 |
| JP | H0810544 | 1/1996 |
| JP | 2002-291549 | 10/2002 |
| JP | 2004347211 | 12/2004 |
| JP | 2008-95988 | 4/2008 |
| JP | 2009-36401 | 2/2009 |
| JP | 2010-84992 | 4/2010 |
| JP | 2011-58661 | 3/2011 |
| JP | 2013-26623 | 2/2013 |
| JP | 2014-66399 | 4/2014 |
| JP | 2016-114302 | 6/2016 |
| JP | 2016114302 A * | 6/2016 |
| JP | 2016211849 | 12/2016 |
| JP | 2017-12326 | 1/2017 |
| JP | 2017062092 | 3/2017 |
| JP | 3214558 U | 1/2018 |
| KR | 1997-0002811 | 3/1995 |
| KR | 20-1997-0002811 | 8/1999 |
| KR | 10-2006-0111037 | 10/2006 |
| KR | 20060111037 A * | 10/2006 |
| KR | 10-0766430 | 10/2007 |
| KR | 10-2008-0055018 | 6/2008 |
| KR | 10-2008-0055457 | 6/2008 |
| KR | 10-2010-0077951 | 7/2010 |
| KR | 10-2012-0032393 | 4/2012 |
| KR | 10-2012-0071991 | 7/2012 |
| KR | 10-1225981 | 1/2013 |
| KR | 10-2014-0028586 | 3/2014 |
| KR | 1020140073326 | 6/2014 |
| KR | 20150047253 | 5/2015 |
| KR | 10-2015-0146185 | 12/2015 |
| KR | 10-2016-0006268 | 1/2016 |
| KR | 10-1619719 | 5/2016 |
| KR | 10-2016-0063844 | 6/2016 |
| KR | 10-2016-0144678 | 12/2016 |
| KR | 10-2017-0051276 | 5/2017 |
| KR | 10-1769817 | 8/2017 |
| KR | 10-2018-0003001 | 1/2018 |
| KR | 10-2013-0127093 | 1/2020 |

OTHER PUBLICATIONS

Indian Office Action dated Oct. 29, 2020.
Korean Notice of Allowance dated Aug. 19, 2020.
Indian Office Action dated Apr. 4, 2021 in Application No. 201914001962.
Office Action dated Jul. 15, 2021, in U.S. Appl. No. 16/253,772.
Korean Notice of Allowance dated Oct. 16, 2020.

* cited by examiner

AIR PURIFIER

CROSS-REFERENCE TO RELATED APPLICATIONS

The present application claims priority under 35 U.S.C. § 119 and 35 U.S.C. § 365 to Korean Patent Application No. 10-2018-0007385 (filed on Jan. 19, 2018), No. 10-2018-0019440 (filed on Feb. 19, 2018), No. 10-2018-0087983 (filed on Jul. 27, 2018) and No. 10-2018-0133162 (filed on Nov. 1, 2018), the contents of all of which are hereby incorporated by reference in their entireties.

BACKGROUND

The present invention relates to an air purifier.

The air purifier is understood as a device which sucks contaminated air to purify the contaminated air, and then discharges the purified air. For example, the air purifier may include an air blowing device which introduces outside air into the inner portion of the air purifier, and a filter which is capable of filtering dust, germs, and the like in the air.

In recent years, an air purifier designed to recognize the air purifier as one kind of furniture and emphasize the harmony between the air purifier and the surrounding furniture has been developed. Particularly, in a case where an air purifier is provided in a bedroom, an air purifier is proposed in which an outer appearance panel thereof is made of wood material with an emphasis on harmony with a wardrobe or a bed.

The air purifier may include a drawer-type door similar to general furniture, and the door may be opened and the internal components of the air purifier can be cleaned or replaced.

Further, the upper surface of the air purifier can be made flat and used as a storage space. For example, books or personal items can be stored on the upper surface of the air purifier or used for a table-like purpose.

With respect to such an air purifier, the following related art document is disclosed.
1. Chinese publication number (publication date): CN203274184U (Nov. 6, 2013)
2. Title of invention: Casing of indoor air purifier According to the related art document as described above, the following problems may exist.

First, since the air purifier is constituted with an appearance such as furniture, it is not easy to constitute and arrange a display for displaying operation information of the air purifier. It is not easy to configure and arrange an input unit which allows a user to input a predetermined command.

Secondly, when the air purifier is used for a storage room or a dining table, water or beverage can be poured into the air purifier and flow into the air purifier. In this case, driving parts or electric component devices of the air purifier may fail due to the introduced fluid.

Third, when the door of the air purifier is configured as a drawer type, an accident that the user's hand gets caught may occur when the door is opened to replace the air purifier filter or the like and then the door is closed.

SUMMARY

An objective of an embodiment of the present invention is to provide an air purifier which facilitates confirmation of operation information of the air purifier and an input operation by providing a display device on the upper portion of the air purifier.

In addition, another objective of the present invention is to provide an air purifier which has an electric component unit on the upper portion of the air purifier and has an upper panel on the electric component unit, so that the electric component unit can be protected by the upper panel.

In addition, another objective of the present invention is to provide an air purifier in which an electric plate on which a plurality of electric components are installed is formed to be inclined downward in a specific direction and a drain port is formed below the electric plate, thereby capable of discharged a fluid through the drain port even if the fluid is injected into the inside of the electric component unit.

In addition, another objective of the present invention is to provide an air purifier movably provided with the front configuration of the air purifier in which a door is disposed.

In addition, another objective of the present invention is to provide an air purifier capable of protecting a user since a configuration in contact with a user's hand moves away from a door even when the user's hand is caught in the door when the door is closed.

In addition, another objective of the present invention is to provide an air purifier which has a guide structure for preventing shaking when moving in the forward and backward directions.

In addition, another objective of the present invention is to provide an air purifier capable of charging an electronic device by providing wired and wireless charging modules in the air purifier.

In order to accomplish the above objective, an air purifier according to an embodiment of the present invention includes a display between a front panel and an upper panel.

The front panel includes a door which is drawn in toward the display or drawn out from the display.

A display module including the display is disposed below the upper panel.

The display module may be installed on the electric plate disposed on the upper portion of the air purifier.

An air conditioned space in which a filter and a fan are disposed is formed on the lower side of the electric plate, and an electric unit is formed on the electric plate.

The display module may be retracted rearward or may be moved in a direction to be drawn out forward.

The display module includes a guide protrusion for guiding the forward and backward movement of the display module.

The electric plate includes a guide rib into which the guide protrusion is inserted.

The guide protrusion may be further provided with a spring for providing an elastic force.

The display module further includes a damper for reducing the forward movement speed of the display module.

The damper includes a gear interlocked with a damper guide of the electric plate.

The electric plate is inclined downward to the rear.

The electric plate is inclined downward to the rear toward a drain port.

A wireless charging module is installed in the upper panel.

The wireless charging module includes a coil assembly composed of three coils.

The three coils include two bottom coils and one top coil overlapping on the upper side of the two bottom coils.

In another aspect, an air purifier according to an embodiment of the present invention may includes a door coupled to be drawn out from the cabinet, and a display provided between upper surfaces of the cabinet, wherein the identification of the user and the operation of the input menu can be facilitated.

The air purifier may include a door for selectively opening and closing a front surface of the cabinet, and an upper panel spaced rearward from the door and forming an upper surface of the cabinet.

The air purifier may include a display module which is exposed to the outside through a display groove defined as a space separated between a front surface of the upper panel and a rear surface of the door.

In addition, the door may be configured to be drawn out or drawn in from the front of the cabinet.

In addition, the door may be provided with an air filter for purifying the air and a humidifying filter for humidifying the air.

In addition, a front surface of the display module may be in contact with a rear surface of the door. The display module may be movable in forward and backward directions. Accordingly, even if a user's hand is caught, it may not be hurt by the display module moving backward.

In addition, the upper panel may include a front groove formed by cutting backward from the front surface of the upper panel. The front groove may form a retraction space in which the display module is movable. Therefore, the display module can be moved backward without interference by the recessed space.

In addition, the air purifier may further include an electric plate disposed below the upper panel. The display module may be movably coupled to the electric plate.

In addition, the electric plate may include a front supporter constituting a front end portion.

In addition, the display module may include a display mounting portion supported by the front supporter and a display cover coupled to an upper side of the display mounting portion.

In addition, the display cover may include a first cover portion exposed through the display groove, and a second cover portion extending to a rear side of the first cover portion and including a dent which guides connection with the electric plate.

In addition, the dent may include a first dent for guiding connection with a damper assembly for adjusting the forward and backward movement speed of the display module, and a second dent penetrating the fastening member for restricting movement of the display module in the vertical direction and the both side directions.

In addition, a guide slit which is an opening extending in forward and backward directions is formed in the second dent. The fastening member may be inserted into the guide slit and coupled to the electric plate.

The damper assembly may further include: a damper coupled to a lower end of the first dent and having gears, and a damper guide provided on the electric plate and interlocking with the gear.

In addition, the damper may include a rotary oil damper.

In addition, the display module may further include a display PCB disposed on the display mounting portion and having an LED device.

n addition, the display module may further include a reflector disposed above the display PCB to correspond to the LED element.

In another aspect, an air purifier according to an embodiment of the present invention is proposed such that when the door is configured to move in forward and backward directions, the user's hand gripping the upper portion of the door may abut the front of the display, and thus it is possible to reduce the impact on the user by moving the display in forward and backward directions.

The air purifier may include: a cabinet including a side panel and an upper panel provided on an upper side of the side panel; a front panel disposed in front of the side panel and the upper panel; an electric plate installed inside the cabinet and positioned below the upper panel; an air conditioned space formed below the electric plate and having an air filter and an air blowing fan; and a display module installed on the electric plate and including a display provided with a user input menu.

The display may be disposed between the front panel and the upper panel.

In addition, the cabinet may include a display groove defined as a space recessed between a rear surface of the front panel and a front surface of the upper panel.

In addition, the display may be disposed in a lower portion of the display groove.

In addition, the electric plate may include an electric base on which a plurality of electric components are installed and a base supporter extending upward along an edge of the electric base. The base supporter may support the display module.

In addition, the display may be disposed along a front end of the electric base.

In addition, the front panel may be coupled to a drawer provided movably forward or rearward. The display module may be movable in a direction away from the drawer.

In addition, the display module may include a display mounting portion in which the display PCB is installed, a display cover provided on an upper side of the display mounting portion.

In addition, the display module may further include a guide protrusion protruding rearward from the display cover. And, the guide protrusion may be inserted into a guide rib protruding upward from the electric plate.

In addition, the display cover may include a first cover portion covering the first part of the display PCB and constituting the display, and a second cover portion extending to the rear side of the first cover portion and covering the second part of the display PCB.

In addition, the guide protrusion may include a first guide protrusion extending rearward from a central portion of the second cover portion, and a second guide projection extending rearward from both side portions of the first cover portion.

In addition, a spring may be fitted into the guide protrusion. One end of the spring may be supported by the display cover, and the other end may be supported by the guide rib.

In addition, the display module may further include a guide slit formed in the display cover and extending in forward and backward directions.

A screw may be inserted into the guide slit. The fastening boss provided on the electric plate can be coupled to the screw.

A washer may be coupled to a head of the screw, and the diameter D1 of the washer may be formed to be greater than the width D2 of the guide slit.

The electric plate may further include a damper assembly coupled to the display cover, and further include a damper assembly which adjusts a forward speed of the display module.

In addition, the electric plate may include a drain port.

In addition, the electric plate may extend downward toward the drain port.

In addition, the electric plate may include an electric base on which a plurality of electric components are installed and a base supporter extending upward along an edge of the electric base. The drain port may be formed in the base supporter.

In another aspect, an air purifier according to an embodiment of the present invention may be proposed such that a wired and/or wireless charging module may be provided to hold the air purifier on an electronic device such that a user can easily charge the electronic device with the air purifier.

In addition, it is possible to provide an air purifier capable of guiding an appropriate charging position of the electronic device in consideration of characteristics of air discharged from the air purifier.

An air purifier may include: a cabinet including a side panel, a front panel provided in front of the side panel, and an upper panel provided on the side panel; an electric plate installed inside the cabinet and positioned below the upper panel; an air conditioned space formed below the electric plate and having an air blowing fan; a discharge unit disposed at a rear side of the upper panel and discharging air passing through the air blowing fan; and a wireless charging module supported by the electric plate and installed on a bottom surface of the upper panel.

The wireless charging module may be in contact with the bottom surface of the upper panel.

The upper panel may include a charging groove formed at a position corresponding to the wireless charging module and recessed upward from the bottom surface to form a heat dissipation space of the wireless charging module.

In addition, the upper panel may further include a pressurizing rib protruding downward from the charging groove and contacting an upper surface of the wireless charging module.

In addition, the upper panel may include a seat disposed above the wireless charging module and displaying a wireless charging region of a mobile device.

In addition, the wireless charging module may be disposed in front of a portion of the discharge port where no air is discharged.

In addition, the wireless charging module may include: a module body provided with a coil assembly; a lower case provided below the module body; and an upper case provided on an upper side of the module body and contacting a bottom surface of the upper panel.

In addition, the coil assembly of the wireless charging module may include: two bottom coils disposed in forward and backward directions; and one top coil overlapping upper sides of the two bottom coils.

In addition, the two bottom coils or the one top coil may include a coil turn that is wound by 12 turns.

In addition, the bottom coil or the top coil may have a rectangular shape, a ring shape, or a donut shape with an empty interior.

In addition, the width of the top coil in the forward and backward direction is formed to be greater than the lateral width thereof, and the widths of the bottom coils in the horizontal direction may be greater than the width thereof in the forward and backward directions.

The air purifier according to the embodiment of the present invention has the following effects.

First, the display device is provided on the upper part of the air purifier, so that it is easy to confirm and input operation information of the air purifier.

In addition, there is an advantage that a gap is formed between the door and the upper panel forming the front surface of the air purifier, and the display is exposed through the gap, so that the user can easily access.

In addition, the electric unit is provided on the upper part of the air purifier, and the upper panel is provided on the upper side of the electric field device, so that the electric unit can be protected by the upper panel.

In addition, the electric plate on which the plurality of parts are installed is formed to be inclined downward to the rear side, and the drain port is formed on the rear portion of the electric plate, so that the fluid can be discharged through the drain port even if the fluid is introduced into the electric part.

In addition, the plurality of PCBs are provided on the electric plate, and the PCB is spaced upward from the electric plate by the supporting ribs, so that the fluid can be prevented from flowing into the PCB.

Further, since the display device is movably provided, even when the user's hand is caught between the door and the display device when the door is closed, the front part moves in a direction away from the door, thereby preventing the hand from being injured.

Particularly, the door is configured to be drawn in forward and backward directions, and the display device can be moved in forward and backward directions, thereby reducing the impact on the user.

In addition, the charging module may be provided in the air purifier to charge the electronic device.

Particularly, the wireless charging module is provided in the air purifier, so that charging can be easily performed by mounting an electronic device in the air purifier.

The air purifier is provided with the wired charging module, so that electronic devices can be connected to a USB port by wire, thereby facilitating the charging.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s).

Figure 1:
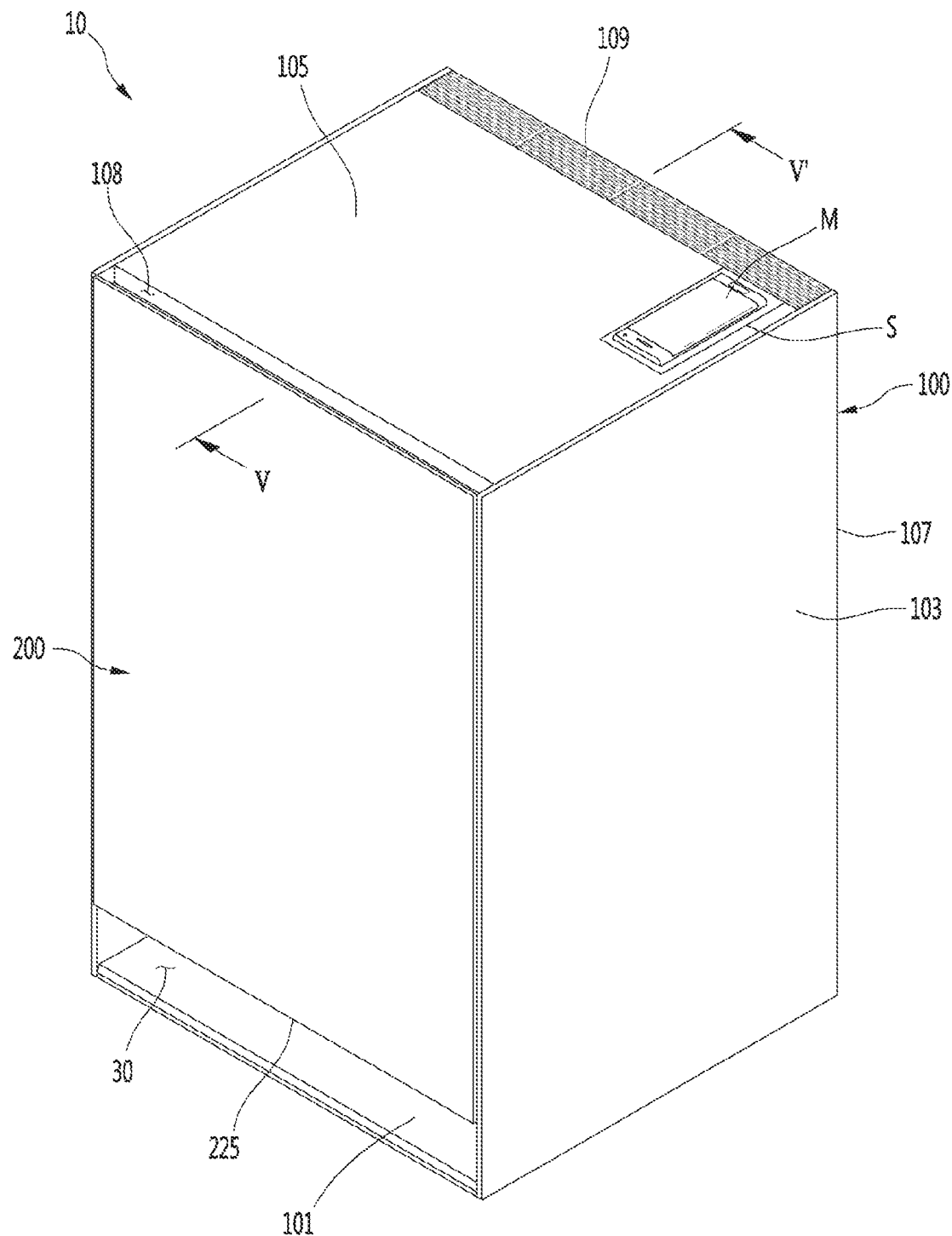
FIG. 1 is a perspective view illustrating a configuration of an air purifier according to an embodiment of the present invention.
Figure 2:
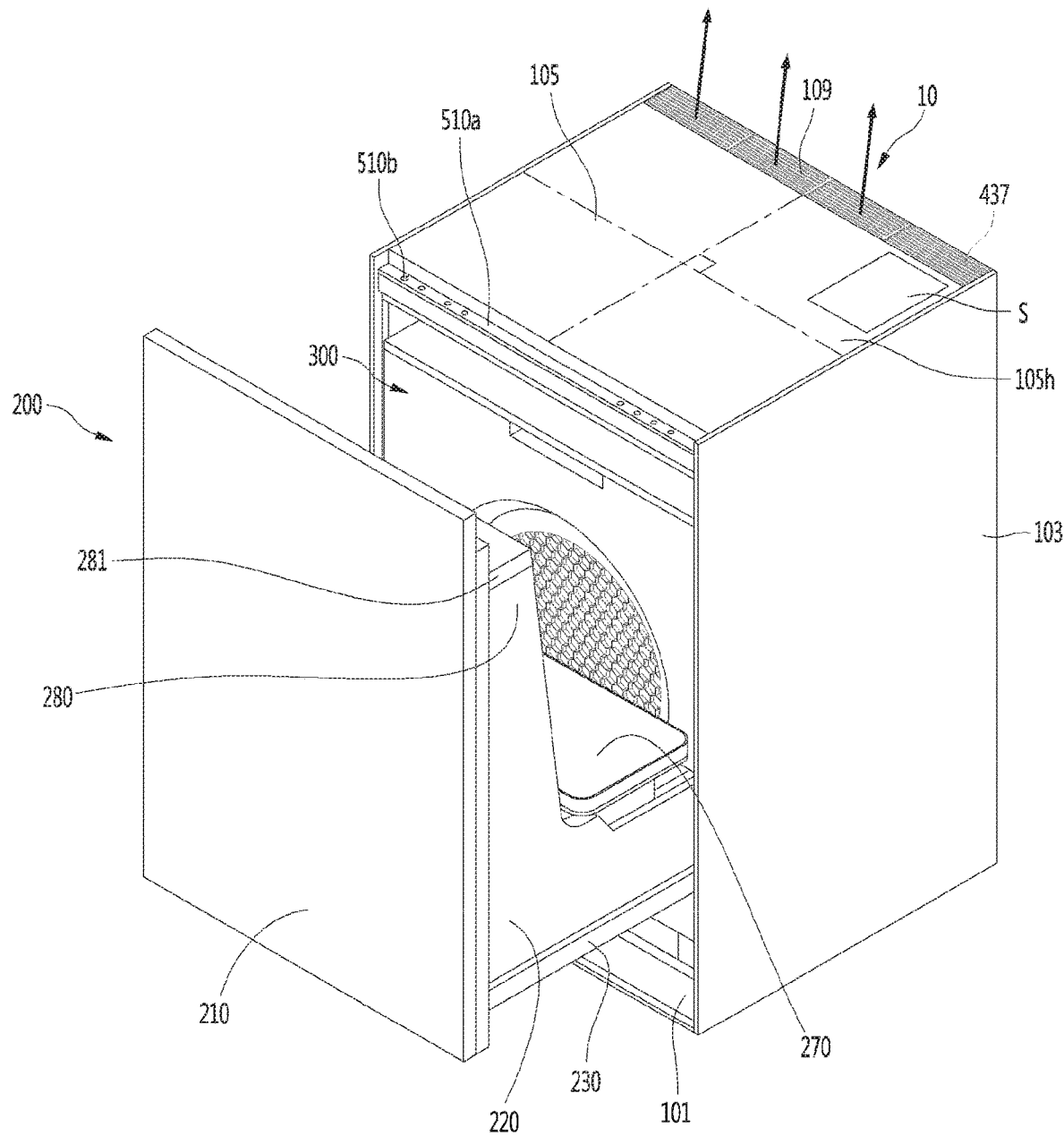
FIG. 2 is a view illustrating a state where a door of the air purifier according to an embodiment of the present invention is opened.

FIG. 1 is a perspective view illustrating a configuration of an air purifier according to an embodiment of the present invention, and FIG. 2 is a view illustrating a state where a door of the air purifier according to an embodiment of the present invention is opened.

Referring to FIG. 1 and FIG. 2, the air purifier 10 according to an embodiment of the present invention includes a cabinet 100 forming an outer appearance and a door assembly 200 coupled to the cabinet 100 to be capable of being drawn out from the cabinet.

The cabinet 100 includes a panel assembly composed of a plurality of panels.

The plurality of panels includes a lower base 101, two side panels 103 provided on both sides of the base 101 and extending upward, an upper panel 105 coupled to an upper side of the two side panels 103, and a rear panel 107 coupled to a rear side of the two side panels 103.

By the base 101, the two side panels 103, the upper panel 105, and the rear panel 107, the cabinet 100 can have a shape of a rectangular parallelepiped which is opened frontward.

The plurality of panels may be made of wood material. Therefore, the air purifier 10 can give an aesthetical feel of the furniture. In other words, the appearance can be enhanced.

In the inner space of the cabinet 100, an air filter assembly 280, a humidifying filter assembly 300, an air blowing fan (420, see FIG. 5), and the like may be disposed. The air filter assembly 280 and the humidifying filter assembly 300 may be collectively referred to as a "filter assembly".

The door assembly 200 may be opened by being drawn out to the front side of the cabinet 100 or closed by being drawn in toward the rear side of the cabinet 100.

Therefore, the door assembly 200 may be referred to as a "door".

The door assembly 200 includes a door panel 210 constituting a front surface portion of the air purifier 10. The door panel 210 may be referred to as "a front panel".

The door panel 210 may have a shape of a square plate. In a state where the door assembly 200 is closed, the door panel 210 forms a front surface of an outer appearance of the air purifier 10. In addition, the door panel 210 is made of wood material so that it can feel aesthetics like furniture.

A recessed portion 30 may be formed between the lower end of the door panel 210 and the base 101 to form a space recessed rearward.

An air intake 225 for sucking air into the cabinet 100 may be formed on the recessed portion 30. For example, the intake 225 may be formed on the bottom surface of the drawer 220.

The upper panel 105 of the cabinet 100 is formed with a discharge portion 109 through which purified air is discharged (see an arrow of FIG. 2). The discharge portion 109 may be positioned on the rear side of the upper panel 105.

The upper panel 105 includes a region where wireless charging of the mobile device M can be performed. The region may be located in front of the discharge portion 109.

In addition, the region may be formed at a position spaced apart from the central portion of the upper panel 105 in the horizontal direction toward the one side panel 103.

For example, the upper panel 105 may be divided into quadrants. Here, the region where wireless charging of the mobile device M is performed may be formed in the first quadrant 105h of the upper panel 105.

On the other hand, in a portion of the discharge portion 109 positioned on the rear side of the first quadrant 105h, air is not discharged due to a guide plate 437 extending from the housing cover 430.

In detail, the guide plate 437 may be formed at an upper end of the housing cover 430 by a predetermined length. Therefore, the guide plate 437 may cover a part of a discharge port 401 through which the air having passed through the air blowing fan 420 is discharged.

For example, the guide plate 437 may be configured to contact both the front surface of the housing cover 430 and the rear surface of the fan housing 410. And, the guid plate 437 may extend the predetermined length from the right side of the housing cover 430.

That is, the guide plate 437 can shield the right portion of the discharge port 401. Therefore, the guide plate 437 can guide the discharge direction of the air (refer to the arrows of FIG. 2) relatively to the upward direction.

That is, the guide plate 437 can guide air ("discharged air") discharged from the discharge portion 109 not to flow sideways, considering the use environment of the air purifier 10 installed in a room such as a bed or a closet, In general, the air purifier 10 may be installed in a room, in front of a bed, or in front of a wall. If the flow of the discharged air is directed to the side, the wall surface of the room may be moistened, causing mold or the like, and the air current may directly reach the user in the bed, which may cause an uncomfortable feeling. Therefore, the guide plate 437 can guide the discharged air discharged from the discharge unit 109 to be relatively concentrated in the upward direction, considering the user's sleeping environment and indoor hygiene environment.

Therefore, the wireless charging region of the mobile device M is advantageous over the other quadrant regions in that the mobile device M is formed in the first quadrant 105h, which can be protected from the humidified air with the moisture.

The wireless charging region of the mobile device M may be provided with a sheet S indicating that the wireless charging location. For example, the sheet S may include a sticker or a soft cloth. The sheet S may be attached to the upper panel 105.

That is, the sheet S can be attached to the front portion of the discharge portion 109 where air is not discharged. The wireless charging module 600 may be positioned directly below the seat S. Accordingly, the wireless charging module 600 may be positioned in front of a part of the discharge portion 109 where air is not discharged.

The portion of the discharge portion 109 in which air is not discharged may be defined as a region of the discharge portion 109 positioned to correspond to the upper side of the guide plate 437.

The door assembly 200 further includes a drawer 220 extending rearward from a rear surface of the door panel 210.

Components of the air purifier 10 are installed in the drawer 220. The component may include an air filter assembly 280 and a humidifying device. The humidifying device may include a humidifying filter assembly 300, a water tub 260, and a water container 270.

When the door assembly 200 is drawn out to the front side to open the front surface of the cabinet 100, the air filter assembly 280, the humidifying filter assembly 300, and the water container 270 disposed in the drawer 220 can be drawn out forward together. Accordingly, the user can easily access the air filter assembly 280, the humidifying filter assembly 300, and the water container 270.

The door assembly 200 further includes rail guides 230 for guiding the operation of drawing the door assembly 200 out from the cabinet or into the cabinet. The rail guides 230 may be coupled to both sides of the lower portion of the drawer 220.

Figure 3:
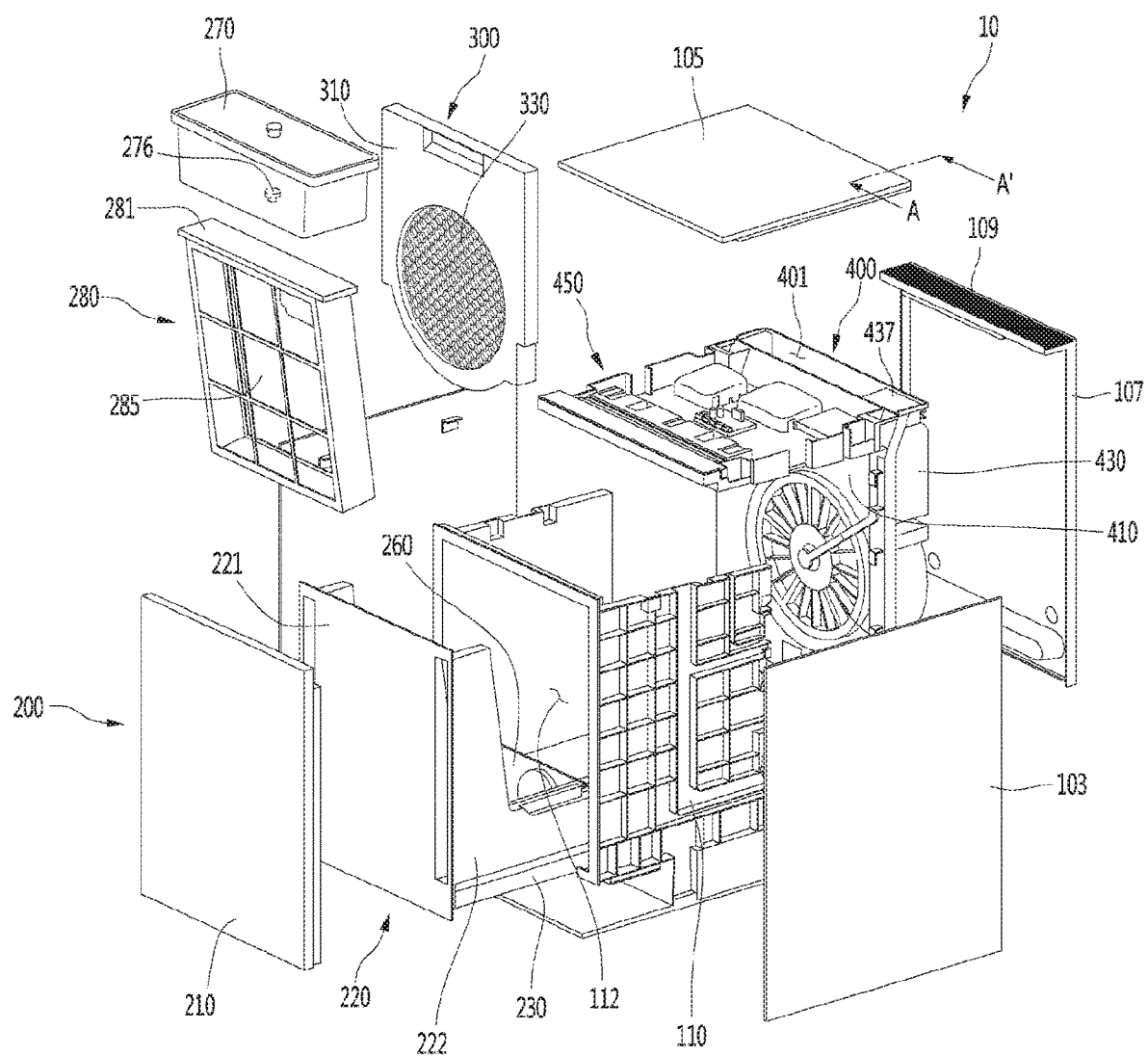
FIG. 3 is an exploded perspective view illustrating a configuration of the air purifier according to an embodiment of the present invention.
Figure 4:
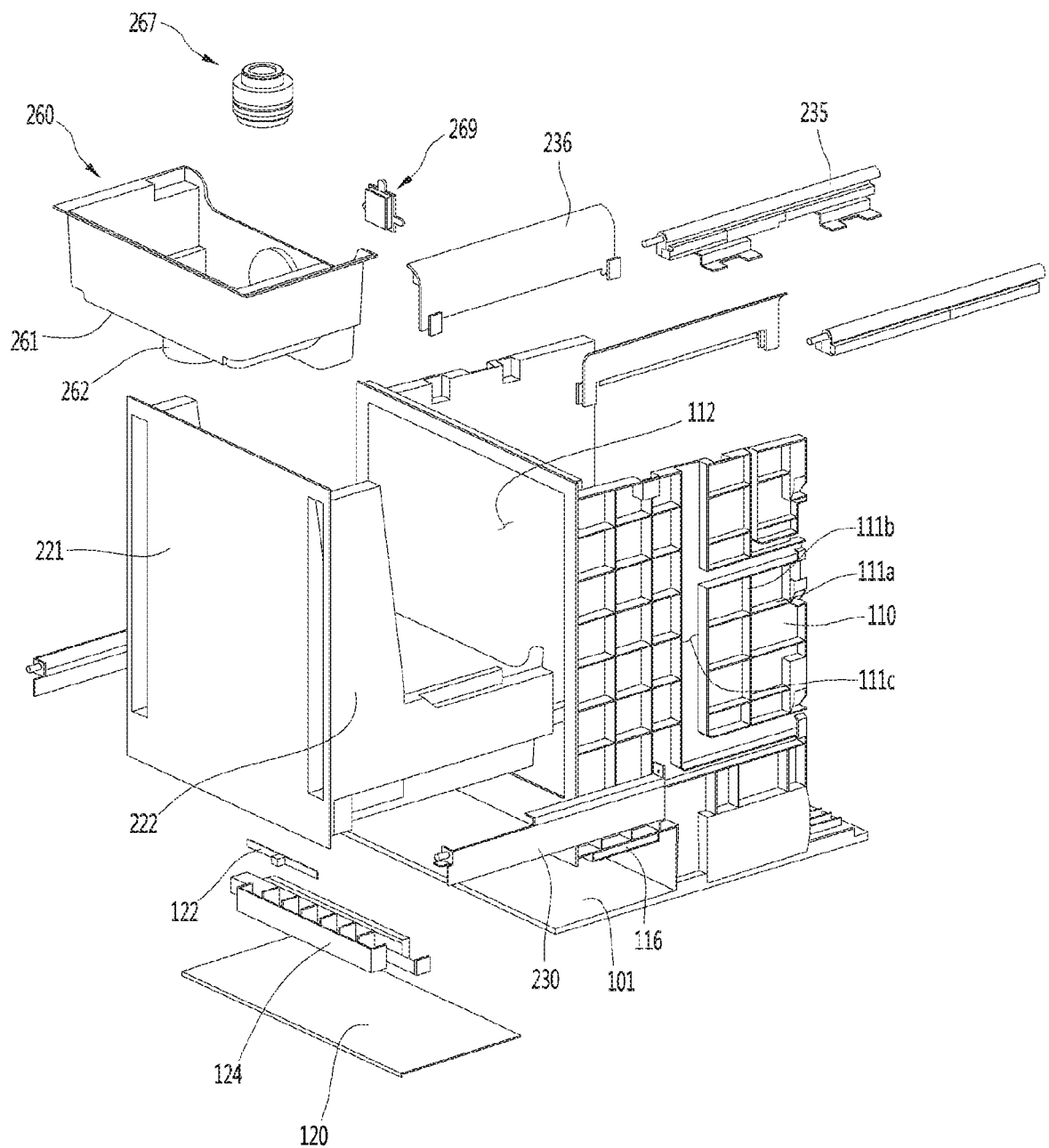
FIG. 4 is an exploded perspective view illustrating a configuration of a portion of the air purifier according to an embodiment of the present invention.
Figure 5:
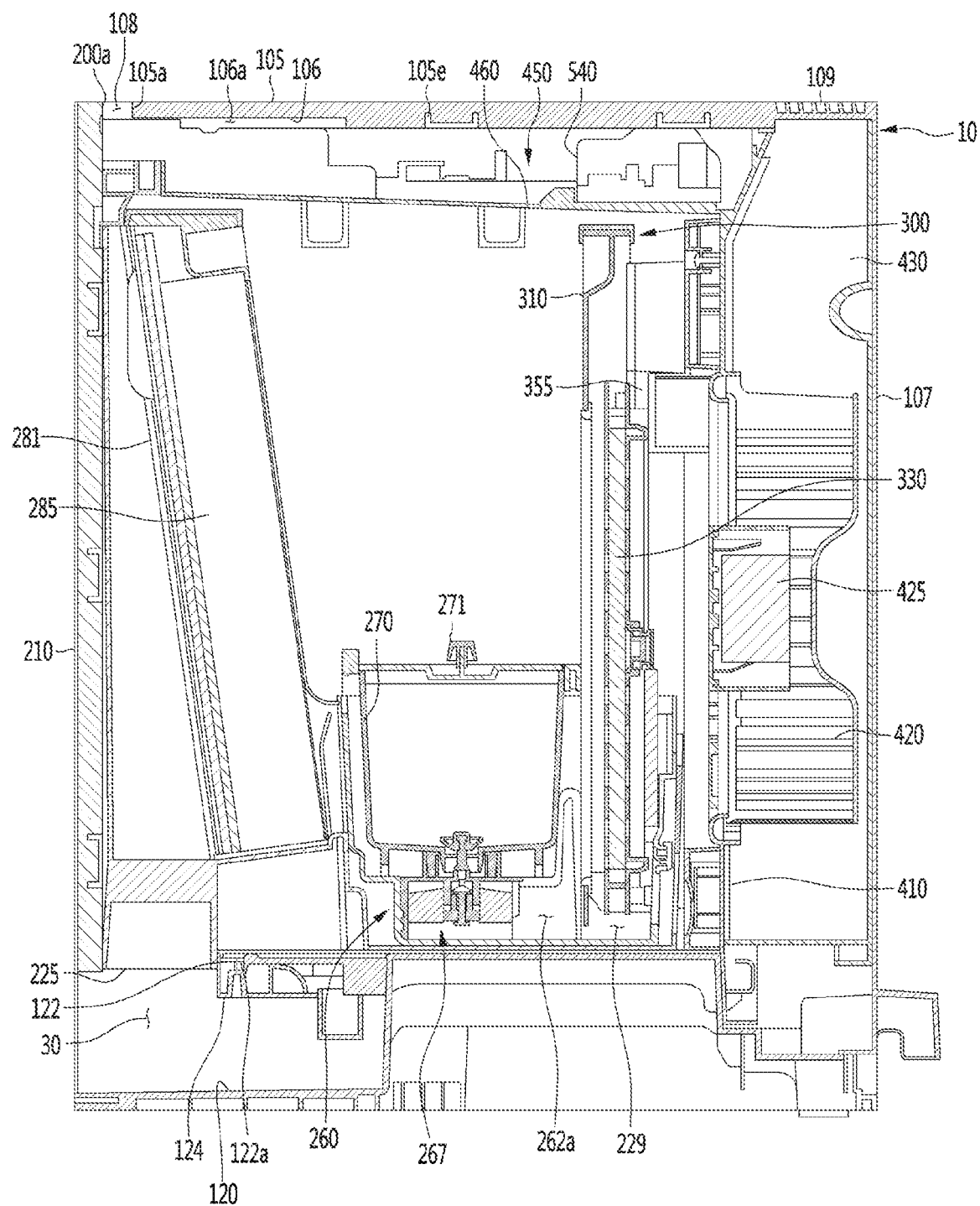
FIG. 5 is a sectional view taken along line V-V' of FIG. 1.

FIG. 3 is an exploded perspective view illustrating a configuration of the air purifier according to an embodiment of the present invention, FIG. 4 is an exploded perspective view illustrating a configuration of a portion of the air purifier according to an embodiment of the present invention, and FIG. 5 is a sectional view taken along line V-V' of FIG. 1.

Referring to FIGS. 3 to 5, the air purifier 10 according to an embodiment of the present invention includes an air filter assembly 280 for filtering air, a humidifying filter assembly 300 for humidifying air, and an air blowing fan 420 for generating an air flow. A fan motor 425 is coupled to the air blowing fan 420.

In detail, the cabinet 100 includes a body frame 110 forming a space portion 112 in which the above-described components are disposed.

The body frame 110 may have a hexahedron shape in which front, rear, and upper surfaces are opened. In detail, the front surface of the body frame 110 is opened, and the opened front surface can be shielded by the door assembly 200. In addition, the rear surface of the body frame 110 is opened, and the opened rear surface can be shielded by a fan housing 410 and a housing cover 430. In addition, the upper surface of the body frame 110 is opened, and the opened upper surface may be shielded by an electric unit 450.

The first base 101 can be understood as a constitution of the body frame 110.

The upper panel 105 is coupled to the upper side of the electric unit 450 and the rear panel 107 is coupled to the rear side of the housing cover 430.

The upper panel 105 may form an upper surface of the cabinet 100. The upper panel 105 may be spaced rearward from the door panel 210 forming the front surface of the door assembly 200. For example, the front surface 105a of the upper panel 105 may be spaced rearward from the rear surface 200a of the door panel.

At least one of the two side panels 103, the upper panel 105, the rear panel 107, and the door panel 210 may be made of wood. Therefore, in order to prevent deformation of the wood and ensure rigidity, at least one of the two side panels 103, the upper panel 105, the rear panel 107, and the door panel 210 may have a metal reinforcing frame 105e inserted therein.

On both side surfaces of the body frame 110, a plurality of reinforcing ribs 111a and 111b may be provided. The reinforcing ribs 111a and 111b includes plurality of first reinforcing ribs 111a extending in the lateral direction and a plurality of second reinforcing ribs 111b extending in the direction intersecting the first reinforcing ribs 111a. For example, the second reinforcing rib 111b may extend in the longitudinal direction.

In addition, on both side surfaces of the body frame 110, a drainage flow path 111c for guiding the fluid drained from the electric unit 450 downwardly may be formed. The drainage flow path 111c can be understood as a flow path formed between the first and second reinforcing ribs 111a and 111b.

The door assembly 200 includes a door panel 210 forming an outer appearance of a front surface and a drawer 220 extending to the rear side of the door panel 210.

The drawer 220 includes a door front portion 221 coupled to a rear surface of the door panel 210. The door panel 210 and the door front portion 221 may be collectively referred to as a "door front portion".

The drawer 220 further includes a door side surface portion 222 extending rearward from both sides of the door front surface portion 221, a door lower surface portion 224 provided below the door side surface portion 222, and a door rear surface portion 223 extending upward from the rear side of the door lower surface portion 224.

The intake 225 may be formed in the lower surface portion 224 of the door.

In addition, an installation space in which a water tub 260, a water container 270, and a humidifying filter assembly 300 are installed can be defined in the drawer 220, by the door front surface portion 221, the door lower surface portion 224, the door side surface portion 222, and the door rear surface portion 223.

For example, the air filter assembly 280 may be installed at a front portion of the drawer 220. The air filter assembly 280 may include an air filter case 281 and an air filter 285 coupled to the air filter case 281. The air filter assembly 280 may be disposed to be lifted upward and separated.

A water container 270 may be disposed at a substantially central portion of the drawer 220, that is, on the rear side of the air filter assembly 280, with respect to the front and rear direction.

The water container 270 may be installed inside the water tub 260. The water container 270 can be arranged to be lifted upward and separated from the water tub 260 and the user can separate the water container 270 to replenish water or clean the water container 270. In addition, an openable water container lid 271 may be provided on the water container 270.

A valve hole for discharging water and a valve device 276 for selectively opening and closing the valve hole may be provided on the bottom surface of the water container 270.

The valve device 276 can open the valve hole when the water container 270 is placed on the water container support portion 261 provided in the water tub 260 and the valve device 276 can close the valve hole when the water container 270 is separated from the water container support portion 261.

The water tub 260 may have a substantially hexahedral shape with an opened upper portion. The water container support portion 261 for supporting the water container 270 is included in the lower portion of the water tub 260. The water container support portion 261 forms a flat surface.

The water tub 260 further includes a float accommodating portion 262 protruding downward from the water container support portion 261 and having a space in which the float device 267 is installed. The float accommodating portion 262 may have a hollow shape with an empty interior, and for example, the float accommodating portion 262 may be positioned at a substantially central portion of the water container support portion 261 and may extend to be lengthened toward the rear side.

The float accommodating portion 262 forms a first water storage portion 262 in which water is stored and the float device 267 can be provided to be moved in the up and down direction according to the water level stored in the first water storage portion 262. At this time, when the water level of the first water storage portion 262 becomes equal to or higher than the set water level, the float device 267 can move upward to close the valve hole of the water container 270.

A second water storage portion 229 extending rearward from the float accommodating portion 262 and storing water may be formed in the water tub 260. The second water storage portion 229 communicates with the first water storage portion and may form the same water level as the first water storage portion.

The humidifying filter assembly 300 may be installed in the second water storage portion 229. The humidifying filter assembly 300 may be accommodated in a rear portion of the inner space of the drawer 220. The humidifying filter assembly 300 may be disposed on the rear side of the water container 270.

The humidifying filter assembly 300 includes a humidifying filter case 310 and a humidifying filter 330 that is rotatably supported by the humidifying filter case 310 and absorbs water stored in the water tub 260.

The lower portion of the humidifying filter 330 may be disposed to be submerged in the second water storage portion 229.

The humidifying filter 330 has a substantially circular shape and may be rotatably provided. For example, the humidifying filter 330 has a structure similar to that of a "water-wheel". When the humidification filter 330 rotates upward, the water collected from the second water storage portion 229 moves upward, and when the humidifying filter 330 rotates, the collected water flows to the center of the humidifying filter 330 by gravity.

The humidifying filter 330 may be made of a cloth, a felt, or a sponge material that can easily absorb water.

A sterilizing device 269 for irradiating light toward the inside of the water tub 260 may be disposed on the rear side of the water tub 260 so as to sterilize the water stored in the water tub 260. For example, the sterilizing device 269 may include an ultraviolet LED.

The air purifier 10 further includes a housing assembly 400 disposed inside the cabinet 100. The housing assembly 400 may be disposed on the rear side of the door assembly 200. In other words, the housing assembly 400 is disposed on the rear side of the rear portion of the drawer 220.

In detail, the housing assembly 400 includes a fan housing 420 having an air blowing fan 420 for generating an air flow, a fan housing 410 having a fan intake disposed in front of the air blowing fan 420 and sucking air therein, and a housing cover 430 coupled to the rear side of the housing 410. The air blowing fan 420 may be installed in a fan installation space defined by the fan housing 410 and the housing cover 430.

The air blowing fan 420 includes a centrifugal fan which sucks air in an axial direction and discharges the air in a radial direction. For example, the centrifugal fan may include a sirocco fan. The axial direction of the air blowing fan 420 may be forward and backward directions.

The air purifier 10 further includes an electric unit 450 having a plurality of electric components. The electric unit 450 further includes an electric plate 460 covering the opened upper portion of the body frame 110, and the electric components can be installed on the upper surface of the electric plate 460.

The cabinet 100 may include an air conditioned space in which filters 285 and 330 and an air blowing fan 420 are installed to purify and/or humidify the air. An air filter 285 and/or a humidifying filter 330 may be installed in the air conditioned space.

Inside the cabinet 100, an electric component space in which electric components are installed is included.

The air conditioned space and the electric component space are vertically partitioned by the electric plate 460. That is, the electric component space may be located above the electric plate 460, and the air conditioned space may be located below the electric plate 460.

The electric plate 460 may extend forward from the upper portion of the housing assembly 400.

The upper panel 105 is coupled to the upper side of the electric plate 460 to protect the electric components.

As described above, the upper panel 105 may be provided with a reinforcing frame 105e to prevent deformation of the wood and ensure rigidity.

The reinforcing frame 105e may be inserted into the inner surface of the upper panel 105. That is, the reinforcing frame 105e may be installed so as to be inserted upward from the bottom surface of the upper panel 105. The reinforcing frame 105e may be provided in a plurality of reinforcing frames.

In addition, the upper panel 105 may be formed with a retraction space 106a of a display module 510, which is movable in the forward and backward directions so as to prevent the user's hand from being caught. The display module may be referred to as "display device".

In detail, on the bottom surface of the upper panel 105, a front groove 106 may be formed by cutting a predetermined length rearward from the front surface 105a facing the rear panel 200a of the door panel 210.

That is, the front groove 106 may form a retraction space 106a which is recessed backward from the front surface 105a of the upper panel 105. For example, the front groove 106 may form a "⌐-shaped" groove on the bottom surface of the upper panel 105.

The front surface 105a of the upper panel 105 may be referred to as a "panel front 105a". The rear surface 200a of the door panel 210 may be referred to as a "door rear surface 200a".

The front groove 106 may be formed to come into contact with the upper surface of the display module 510. Therefore, when the user's hand is caught between the rear surface 200a of the door panel 210 and the front surface of the display module 510, the upper end of the display module 510 can smoothly move backward along the front groove 106. Accordingly, a safety accident of the user can be prevented.

That is, the front groove 106 may form a space in which the display module 510 can move in the forward and backward directions. Hereinafter, the space formed by the front groove 106 is referred to as a retraction space 106a.

Inside the body frame 110, a sliding rail 235 may be installed to guide the operation of drawing the door assembly 200 out and into.

The sliding rails 235 may be disposed on both sides of the lower portion of the body frame 110.

The sliding rail 235 may include a body coupling portion coupled to an inner surface of the body frame 110.

A rail cover 236 is disposed outside the sliding rail 235. By the rail cover 236, the sliding rail 235 may not be exposed to the outside.

On both side surfaces of the door assembly 200, a rail guide 230 is provided. The rail guide 230 is coupled to the sliding rail 235 to be capable of being drawn out of or drawn into the sliding rail 235 and can be slid forward and rearward.

The body frame 110 further includes an illumination bracket 116 on which a lighting device is installed. The lighting bracket 116 may be disposed on the upper side of the base 101 of the cabinet 100. The recessed portion 30 may be understood as a space between the base 101 and the illumination bracket 116.

The illumination device includes an illumination PCB 122 having an illumination source 122a and an illumination case 124 coupled to the illumination PCB 122. A plurality of the light sources 122a may be provided. The illumination case 124 includes a plurality of compartments for partitioning the internal space of the illumination case 124 into a plurality of spaces, and the illumination source 122a may be disposed in each of the plurality of spaces.

On the upper surface of the front portion of the base 101, a reflection plate 120 may be provided. The reflection plate 120 may be provided to gently reflect or diffuse the light emitted from the illumination source. The illumination source is disposed on the upper side of the reflection plate 120 and irradiates light toward the reflection plate 120 downward. The recessed portion 30 may be formed between the illumination source and the reflection plate 120.

Figure 6:
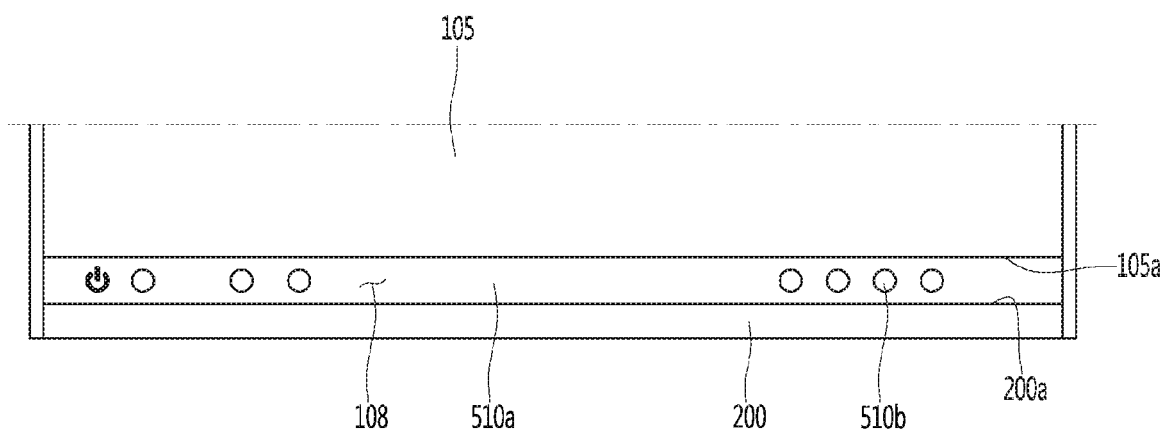
FIG. 6 is a plan view illustrating a configuration of a portion of an upper surface of an air purifier according to an embodiment of the present invention.
Figure 7:
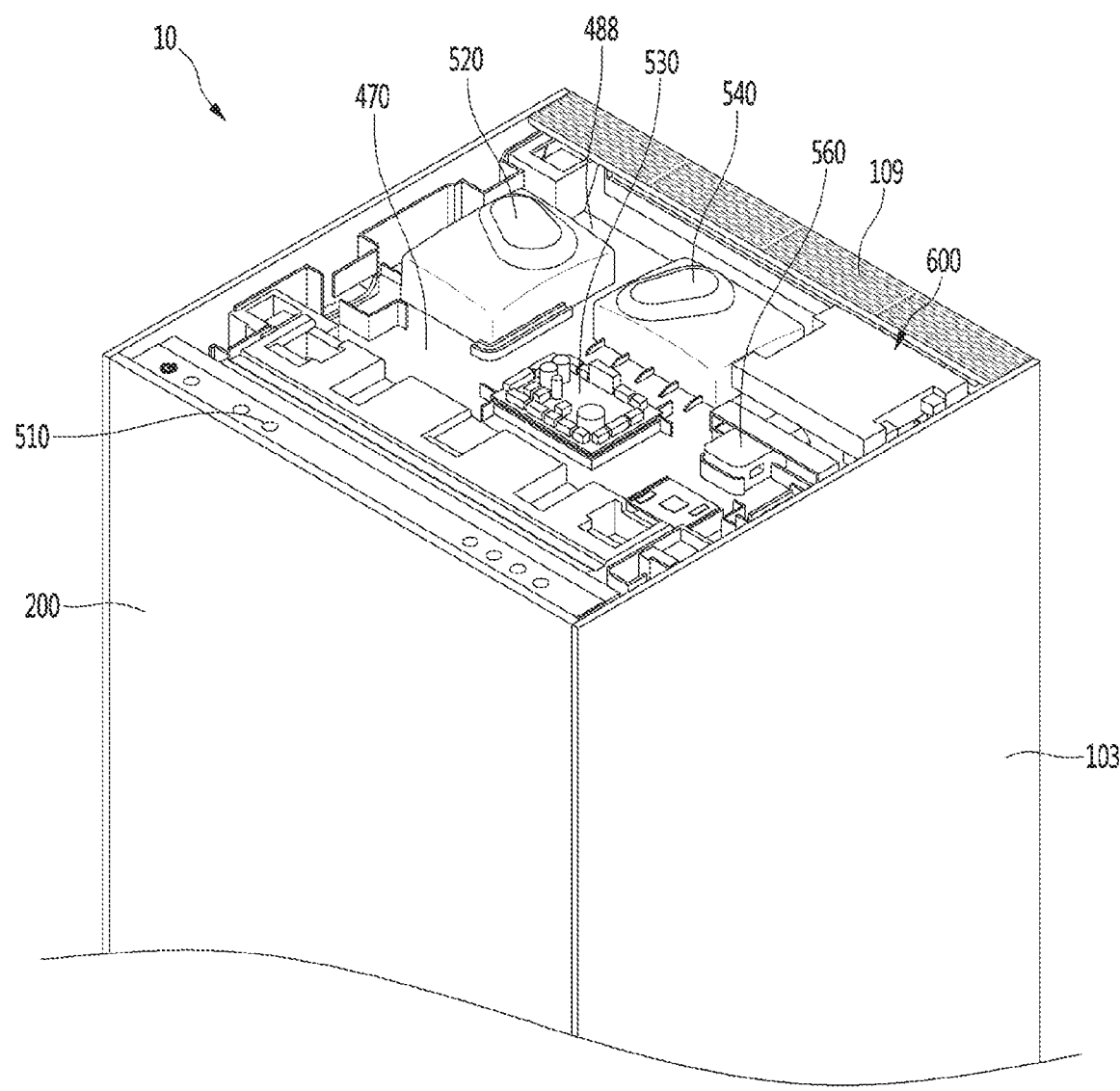
FIG. 7 is a view illustrating a state where an upper panel of the air purifier according to an embodiment of the present invention is opened.
Figure 8:
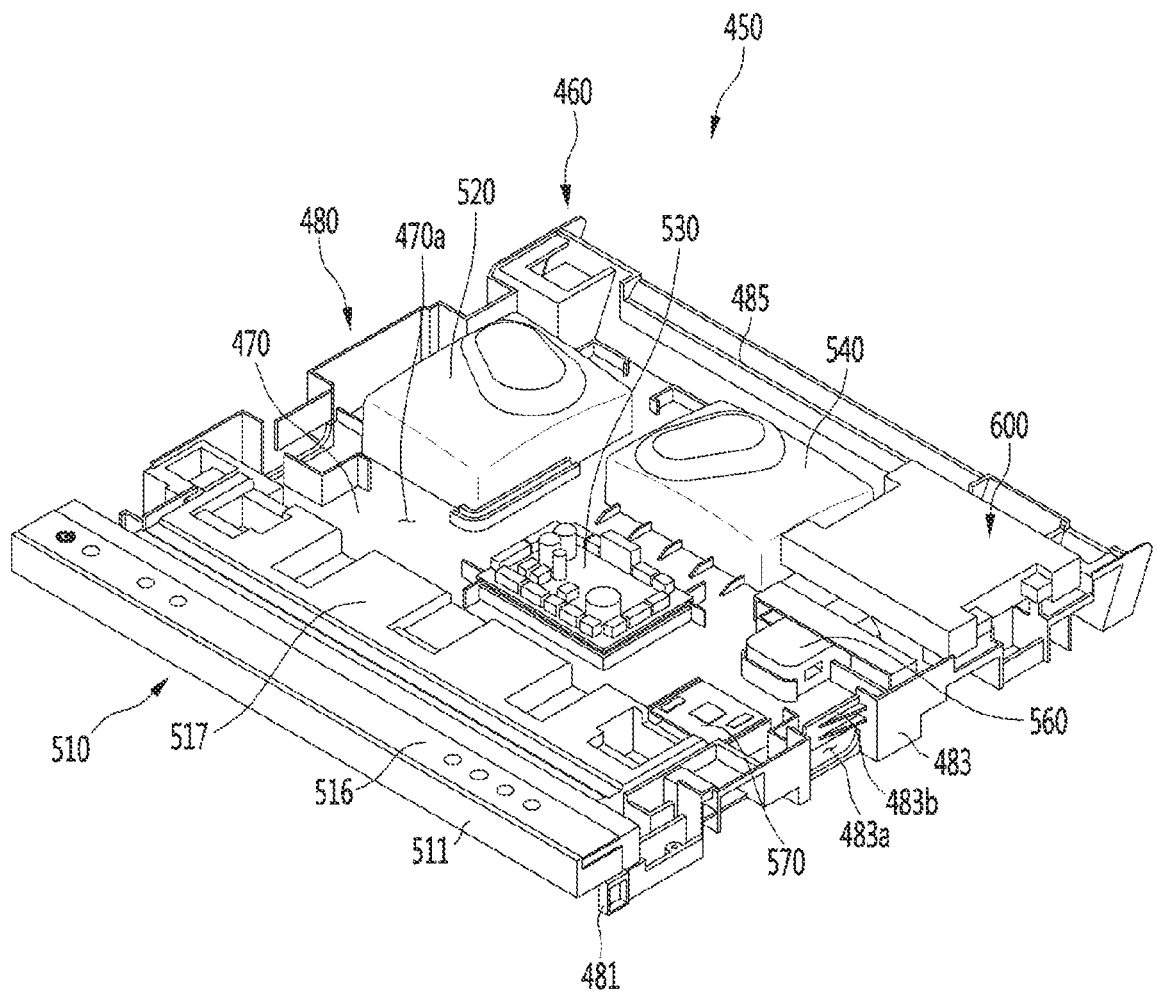
FIG. 8 is a perspective view illustrating a constitution of an electric component unit according to an embodiment.
Figure 9:
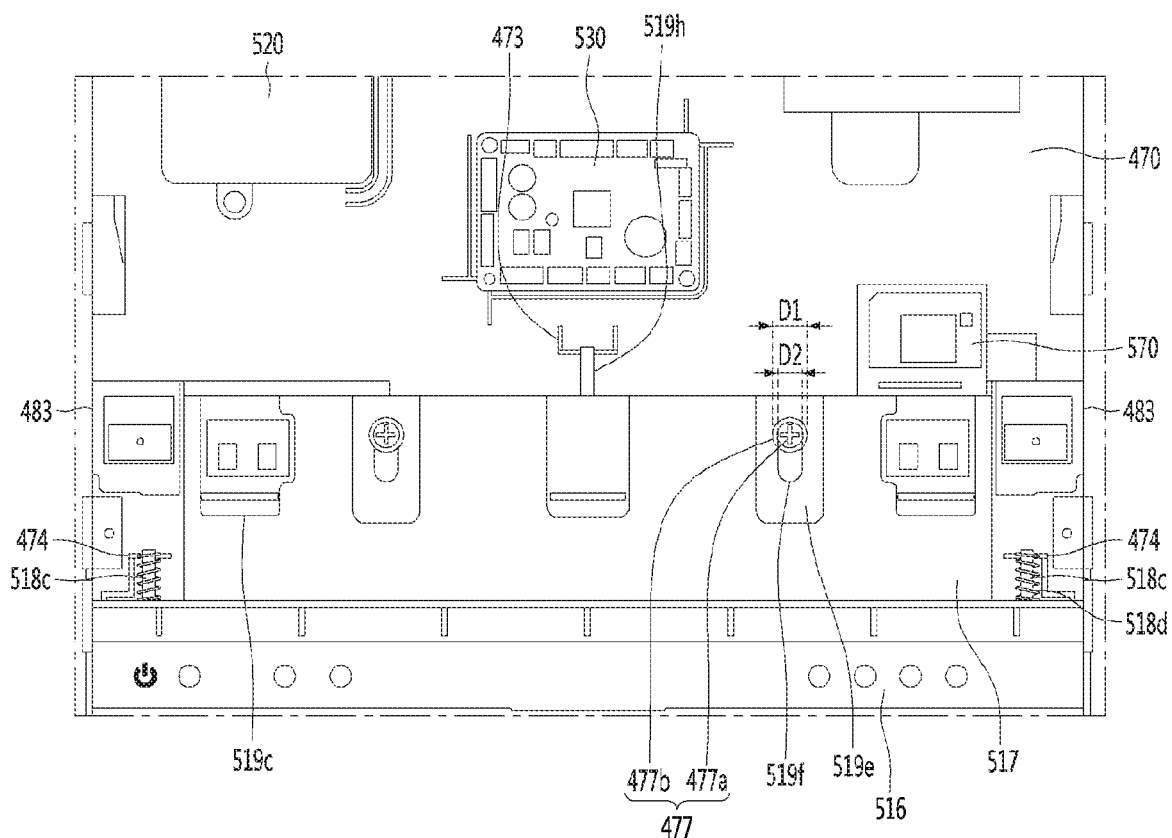
FIG. 9 is a plane view illustrating a constitution of an electric component unit according to an embodiment.
Figure 10:
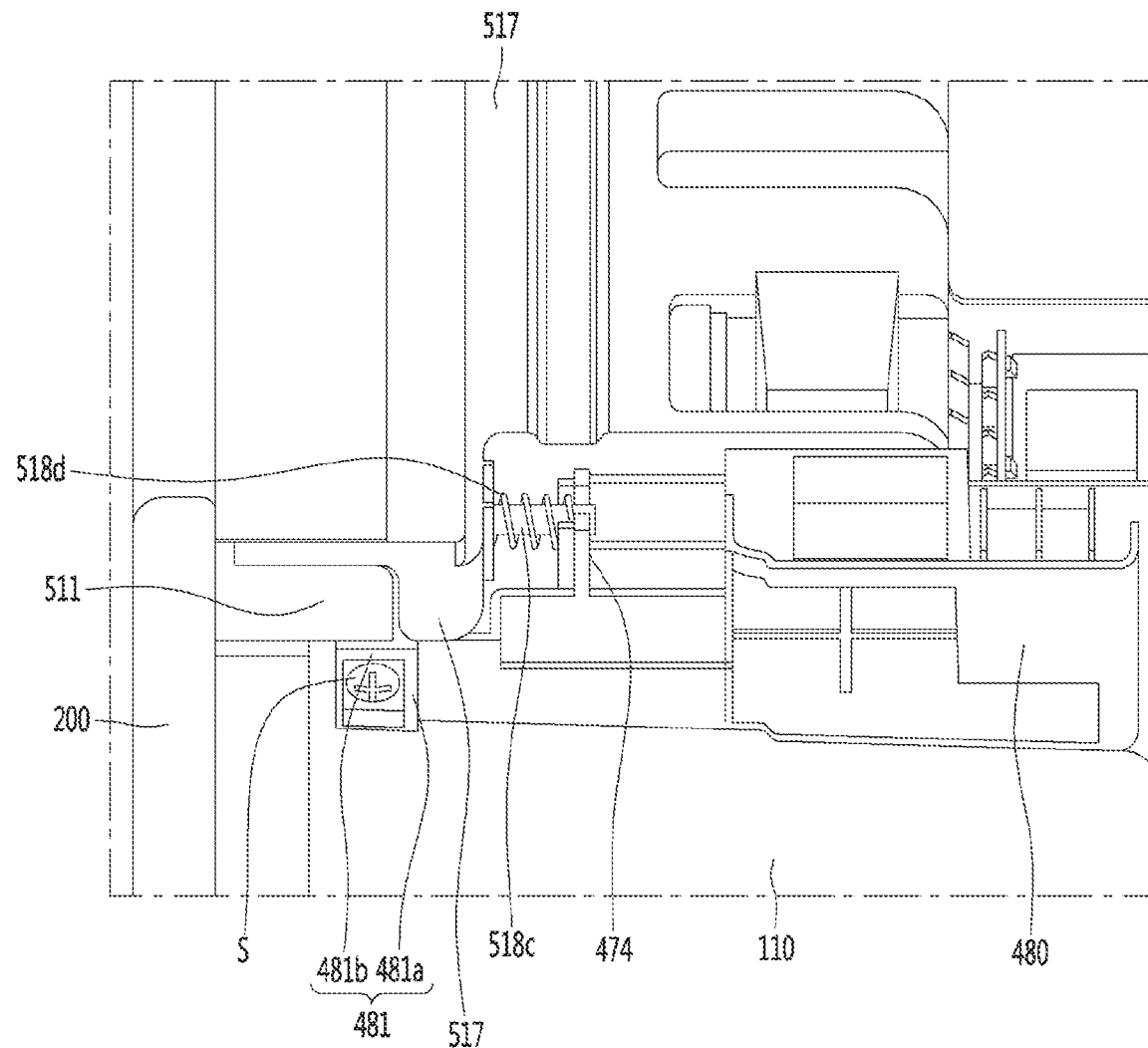
FIG. 10 is a sectional view illustrating a state where a display module is installed in an electric plate according to an embodiment of the present invention.
Figure 11:
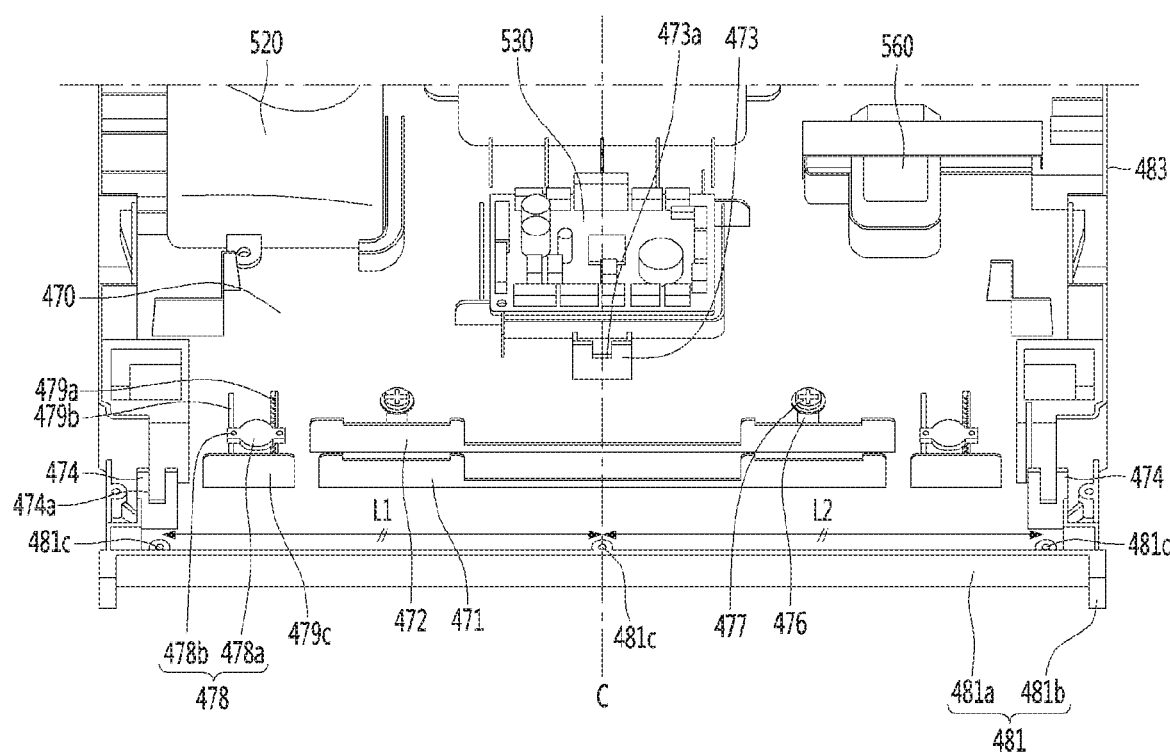
FIG. 11 is a sectional view illustrating a state where a display module is removed from an electric component unit according to an embodiment of the present invention.

FIG. 6 is a plan view illustrating a configuration of a portion of an upper surface of an air purifier according to an embodiment of the present invention, FIG. 7 is a view illustrating a state where an upper panel of the air purifier according to an embodiment of the present invention is opened, FIG. 8 is a perspective view illustrating a constitution of an electric component unit according to an embodiment, FIG. 9 is a plane view illustrating a constitution of an electric component unit according to an embodiment, FIG. 10 is a sectional view illustrating a state where a display module is installed in an electric plate according to an embodiment of the present invention, and FIG. 11 is a sectional view illustrating a state where a display module is removed from an electric component unit according to an embodiment of the present invention.

Referring to FIGS. 6 to 11, the air purifier 10 according to an embodiment of the present invention includes a display 510a on which operation information of the air purifier is displayed.

The display 510a may extend in the left-right direction and may be provided on the upper surface of the display module 510 to be described later. For example, the display 510a may be provided on the front end side of the upper surface of the display module 510.

The display 510a may be exposed to the outside in the space between the panel front surface 105a and the door rear surface 200a of the door.

The display 510a may be provided with a touch part 510b which enables a user input.

A plurality of touch parts 510b may be provided to set the operation mode or the operation function of the air purifier 10. The touch part 510b may be called an "input unit"

For example, the touch part 510b may include a plurality of user input menus for performing a set mode (or function) such as a "power input unit", "clean intensity", "rapid clean", "humidifying clean", a "sleep mode", "air sterilization", "mood lighting", and "lock".

The user can touch and select at least one of the plurality of user input menus by hand.

The display 510a may be positioned between the upper panel 105 and the door assembly 200. In detail, a display groove 108 is formed in the upper portion of the cabinet 100 to form a space recessed downward.

The display groove 108 may be defined by the upper end of the rear surface 200a of the door assembly 200, the upper surface of the display 510a, and the front surface 105a of the upper panel 105. That is, the display groove 108 can be understood as a space spaced between the upper panel 105 and the door assembly 200.

The display 510a may be exposed to the outside through the display groove 108. Accordingly, the user can confirm operation information or operate the touch part 510b through the display 510a exposed to the display groove 108.

The upper panel 105 is configured to be flat, so that the user can use the top panel 105 as a storage space. The storage space may be filled with goods, food, or the like.

Therefore, it may not be easy to dispose the display, which the user should visually confirm, on the upper panel. When the display is disposed at the center of the upper panel, the display may be blocked by the object, food, or the like.

In an embodiment of the present invention, in order to prevent such a problem, the display 510a may be positioned on the front edge side of the upper panel 105. For example, the display 510a may be positioned in front of the panel front surface 105a. The display 510a may be positioned on the rear side of the door rear surface 200a.

That is, the display 510a may be positioned between the panel front surface 105a and the rear door 200a.

As described above, the door assembly 200 may be referred to as a "door". When the door 200 is drawn forward, the front surface of the display 510a may be exposed forward. (See FIG. 2)

Therefore, there may occur a problem of getting a user's hand in the process of closing the door 200. In order to solve this problem, the display 510a according to the embodiment of the present invention may be provided so as to be movable in the forward and backward directions. Details thereof will be described later.

The electric unit 450 includes an electric plate 460 and a plurality of electric components installed in the electric plate 460. The electric plate 460 is installed to shield the open upper portion of the body frame 110.

The rear end of the electric plate 460 may be connected to the upper end of the fan housing 410. That is, the electric plate 460 may be formed in a substantially "¬" shape with the fan housing 410.

In detail, the electric plate 460 includes an electric base 470 which provides a seating surface for a plurality of electric components and a base supporter 480 which extends upward from the electric base 470.

The plurality of electric components may include a display module 510, a power PCB 520, a main PCB 530, a sub PCB 540, a wireless charging module 600, a wired charging module 560, and a Wi-Fi PCB 570.

For example, the display module 510 is disposed at the front portion of the electric base 470, the sub PCB 540 is disposed at the rear portion of the electric base 470, and the main PCB 530 is disposed at the center portion of the electric base 470. The main PCB 530 may be disposed between the display module 510 and the sub PCB 540.

In addition, the power PCB 520 is disposed on the left side of the electric base 470, and the wireless charging module 600 and the wire charging module 560 may be disposed on the right side of the electric base 470. The sub PCB 540 may be disposed between the power PCB 520 and the wireless charging module 600.

The wireless charging module 600 and the wired charging module 560 are disposed adjacent to each other on the right side of the electric base 470 and aligned in the forward and backward directions. The Wi-Fi PCB 570 is located in front side of the wired charging module 560 and may be installed in the display cover 517 to be described later.

The electric base 470 may have a shape of a square plate. On the upper surface of the electric base 470, a plurality of ribs and bosses for supporting or installing the plurality of electric components are provided.

The base supporter 480 may extend upward along the rim of the electric base 470. By the electric base 470 and the base supporter 480, an electric component space having a predetermined size can be defined. The electric components are installed in the electric component space.

In detail, the base supporter 480 includes a front supporter 481 extending upward along the front end of the electric base 470, a side supporter 483 extending upwardly along both ends of the electric base 470, and a rear supporter 485 extending upward along the rear end of the electric base 470.

The front supporter 481 may extend upward from the front end of the electric base 470 by a predetermined height. The display module 510 is placed on the upper surface of the front supporter 481.

The display module 510 may be movably coupled to the front end of the electric plate 460 in the forward and backward directions.

The upper surface of the front supporter 481 can support the display module 510 so as to be slidable forward and backward.

For example, the front supporter 481 may include a first front part 481a extending in both side directions along the front end of the electric base 470 and a second front part 481b extending forward from both ends of the first front part 481a.

The first front part 481a and the second front part 481b contact the display module 510 and support the display module 510. The front supporter 481 may be coupled to the display module 510 by a screw S.

The first front part 481a and the second front part 481b can prevent the display module 510 from being shaken when the display module 510 is moved in the forward and backward directions.

The front supporter 481 further includes a display fixture 481c for selectively fixing the display module 510.

The display fixture 481c may be formed on the back surface of the first front part 481a. The display fixtures 481c may include a plurality of display fixtures disposed spaced apart by predetermined intervals.

The display fixture 481c may be understood as a portion which is coupled by the display module 510 and the screw S.

The user can prevent the display module 510 from sliding forward and backward by coupling the display module 510 to the display fixture 481c. Alternatively, the user can allow the display module 510 to slidably move forward and backward by not coupling the display module 510 to the display fixture 481c.

That is, the user can determine whether to couple the display module 510 to the display fixture 481c by the screw S, and selectively set the movement of the display module 510 in the forward and backward directions.

The side supporters 483 extend upward along both ends of the electric base 470. A pair of side panels 103 may be in contact with and coupled to the side supporter 483.

The side supporter 483 includes wire through-holes 483a through which a wire connected to at least a part of the plurality of electric components passes. The wire through-holes 483a may be formed in the pair of side supporters 483, respectively. In detail, the wire through-hole 483a may be formed to penetrate at least a part of the side supporter 483.

The side supporter 483 may further include a wire rib 483b. The wire rib 483b is formed in the side supporter 483 corresponding to the inside of the wire through-hole 483a so that the wire can be easily arranged. The wire ribs 483b may be provided on the upper side of the wire through-hole 483a.

Meanwhile, the wire through-hole 483a can function not only as a wire but also as a drain port for discharging the water introduced into the electric base 470 to the outside.

The rear supporter 485 extends upward along the rear end of the electric base 470. The rear supporter 485 may be formed to be inclined rearward from the electric base 470. That is, the rear supporter 485 may be extended outward from the rear end of the electric base 470. The rear supporter 485 may be coupled to the housing cover 430.

The electric base 470 includes display support ribs 471 and 472 for supporting the display module 510.

In detail, the display support ribs 471 and 472 are elongated in both directions from the upper surface of the electric base 470 (the horizontal direction with reference to FIG. 11).

The display support ribs 471 and 472 function to support the rear side of the display module 510 when the display module 510 is seated on the front supporter 481. The display support ribs 471 and 472 may be disposed adjacent to the front supporter 481.

The display support ribs 471 and 472 may be formed as a pair so as to stably support the display module 510. For example, the pair of display support ribs 471 and 472 may be disposed spaced apart from each other in the forward and backward directions on the upper surface of the electric base 470.

In detail, the pair of display support ribs 471 and 472 include a first display support rib 471 facing the front supporter 481, and a second display support rib 472 disposed spaced in rear of the first display support rib 471, The first display support ribs 471 and the second display support ribs 472 may be formed to have the same height. Therefore, the display module 510 can be supported more stably than when one display support rib 417 is provided. At this time, the display module 510 can be moved in forward and backward directions while being seated on the upper surface of the display support ribs 471 and 472.

The electric base 470 further includes guide ribs 473 and 474 for supporting a part of the display module 510 and guiding the forward and backward movement of the display module 510.

In detail, guide protrusions 519h and 518c of the display module 510 are inserted into the guide ribs 473 and 474. When the display module 510 moves forward or backward, the guide protrusions 519h and 518c can move forward or backward while being in contact with the guide ribs 473 and 474, respectively.

The guide ribs 473 and 474 protrude upward from the electric base 470. For example, the guide ribs 473 and 474 may extend upward from the upper surface of the electric base 470 and may have a plate shape.

The guide ribs 473 and 474 include a first guide rib 473 disposed at the central portion of the electric base 470 and disposed at the rear side of the display module 510.

The first guide rib 473 is formed with a seating groove 473a in which the first guide protrusion 519h is placed. The seating groove 473a is recessed downward from the upper portion of the first guide rib 473, and the first guide protrusion 519h can be inserted thereinto.

The guide ribs 473 and 474 further include second guide ribs 474 disposed on both sides of the electric base 470 and disposed on the bottom surface of the display module 510.

The second guide ribs 474 are provided with a pair on both sides of the display module 510 and may have a plate shape from the upper surface of the electric base 470.

The second guide rib 474 is formed with a seating groove 474a in which the second guide protrusion 518c is placed. The seating groove 474a is recessed downward from the upper portion of the second guide rib 474, and the second guide protrusion 518c can be inserted thereinto.

The pair of second guide ribs 474 may be disposed symmetrically with respect to the first guide ribs 473. That is, a vertical distance L1 between one second guide rib 474 and the first guide rib 473 may be designed to be equal to a vertical distance L2 between the other second guide rib 474 and the first guide rib 473. The second guide ribs 474 may be disposed on both sides of the front portion of the electric base 470.

Since the pair of second guide ribs 474 are respectively connected to the side supporter 483, the support force of the display module 510 can be reinforced.

In summary, the front portion of the display module 510 can be placed on the front supporter 481 and the display support ribs 471 and 472. Both side portions of the display module 510 are supported by the second guide ribs 474, and the rear portion of the display module 510 can be supported by the first guide ribs 473.

Therefore, in a state where the display module 510 is installed on the electric plate 460, the display module 510 is not twisted in a horizontal direction when the display module 510 is moved forward and backward, and the display module 510 can be moved in forward and backward directions, that is, in a linear direction.

The electric base 470 further includes release prevention portions 476 and 477 for restricting upward and downward movement of the display module 510 when the display module 510 is moved forward or backward.

The release prevention portions 476 and 477 may be configured to prevent the display module 510 from being twisted in the vertical direction when the display module 510 moves backward to be entered or moves forward to be returned.

In detail, the release prevention portions 476 and 477 include a fastening boss 476 extending upward from the electric base 470, and a fastening member 477 which penetrates a part of the display module 510 and is fastened to the fastening boss 476.

The fastening boss 476 includes a coupling hole which extends upward from the upper surface of the electric base 470 and into which the fastening member 477 is inserted. For example, the fastening boss 476 may have a cylindrical shape.

The fastening bosses 476 may be arranged on both sides of the electric base 470 and may be disposed on the rear side of the display support ribs 471 and 472. In detail, the pair of fastening bosses 476 are arranged symmetrically with respect to a virtual center line C dividing the electric base 470 to the left and right. That is, the pair of fastening bosses 476 may be spaced at equal intervals in the lateral direction with respect to the imaginary center line C, respectively.

The fastening member 477 may include a screw 477a and a washer 477b. For example, the screw 477a may include a cylindrical body and a head provided at an upper end of the body. The washer 477b can be fitted to the lower side of the head. The washer 477b may be formed larger than the diameter of the head.

A guide slit 519f formed on the display module 510 may be disposed above the fastening boss 476, and the fastening member 477 may penetrate the guide slit 519f downward from above and can be fastened to the fastening boss 476.

Since the diameter D1 of the washer 477b of the fastening member 477 is formed to be larger than the diameter D2 of the guide slit 519f, the upward movement of the display module 510 due to interference with the washer 477b is limited.

That is, by pushing the display module 510 downward by the washer 477b, it is possible to prevent the display module 510 from moving upward in the process of moving the display module 510 forward and backward.

The electric base 470 further includes a damper assembly for controlling a moving speed when the display module 510 is moved forward.

The damper assembly may be configured to decelerate a drawing speed when the display module 510 is drawn forward in a state where the display module 510 is drawn backward.

That is, the damper assembly is coupled to the display module 510, and the display module 510 is decelerated to be drawn out at a predetermined speed when the display module 510 is drawn out forward.

On the other hand, when the display module 510 moves backward, the damper assembly may not provide a damping force.

Accordingly, in the process of drawing the door 200, when the user's hand is caught on the front surface of the display module 510, the display module 510 moves quickly backward, thereby preventing the user from being injured.

In a state where the display module 510 is retracted, the display module 510 can be slowly moved forward so as to provide a time margin for the user to take his or her hands off. This can satisfy the emotional needs of the user, resulting in higher quality of the product.

More specifically, the damper assembly includes a damper 478 coupled to the display module 510 and a damper guide 479 contacting the damper 478 to guide movement of the damper 478.

The dampers 478 may be provided with a pair on both sides of the electric base 470.

The damper 478 is configured to reduce the moving speed of the display module 510 by using the flow resistance of viscous fluid such as oil filled in the damper 478. That is, the damper 478 includes a rotary oil damper.

Figure 14:
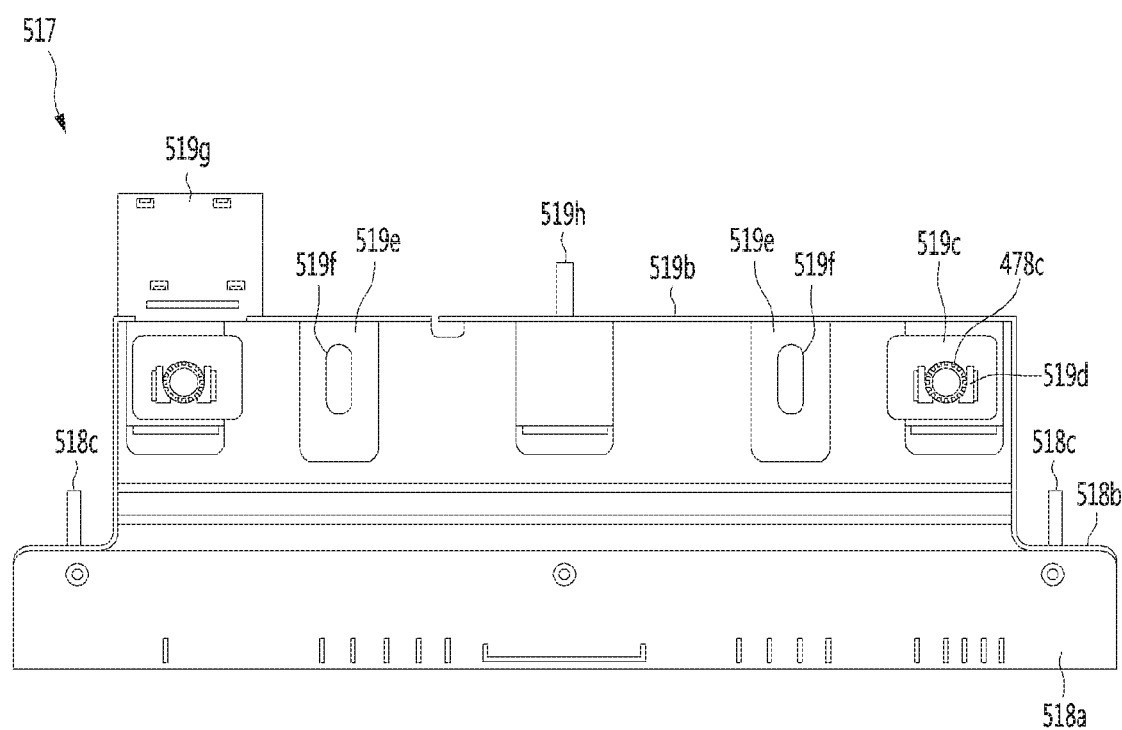
FIG. 14 is a bottom view illustrating a configuration of a display cover according to an embodiment of the present invention.

In detail, the damper 478 includes a damper main body 478a having a flange portion 478b coupled to a display cover 517 (see FIG. 12) provided in the display module 510, and a damper gear 478c provided at the lower portion of the damper main body 478a and gear-linked to the damper guide 479 (see FIG. 14).

The flange portion 478b is provided on both sides of the damper main body 478a, and the display cover 517 includes a pair of damper coupling portions 519d (see FIG. 14) coupled to the flange portion 478b.

The flange portion 478b is supported on the upper side of the damper coupling portion 519d, and the damper gear 478c may extend downward of the damper main body 478a in a space between the pair of damper coupling portions 519d.

The damper guide 479 includes a pair of gear guides 479a and 479b disposed on both sides of the damper 478. For example, the pair of gear guides 479a and 49b may include a first gear guide 479a disposed on one side of the damper 478 and a second gear guide 479b disposed on the other side.

The first and second gear guides 479a and 479b may extend in forward and backward directions. The first and second gear guides 479a and 479b may be spaced apart from each other in the horizontal direction.

The first gear guide 479a can be engaged with the damper gear 478c. That is, the first gear guide 479a may be provided as a rack gear so as to be interlocked with the damper gear 478c.

The second gear guide 479b may be a bar and may not be interlocked with the damper gear 478c.

When the display module 510 moves backward and then returns to the front, the flow resistance of the oil acts on the damper gear 478c and the rotation speed of the damper gear 478c may decrease. Accordingly, the moving speed of the display module 510 can be reduced.

The damper guide 479 further includes a gear rib 479c. The gear rib 479c extends upward from the upper surface of the electric base 470 and can be connected to the first and second gear guides 479a and 479b.

For example, the gear rib 479c may connect the front ends of the first and second gear guides 479a and 479b. At this time, the gear rib 479c may be disposed on the side of the first display support rib 471.

The gear rib 479c is formed at the same height as the first display support ribs 471 to support the display module 510 together with the first display support ribs 471.

Figure 12:
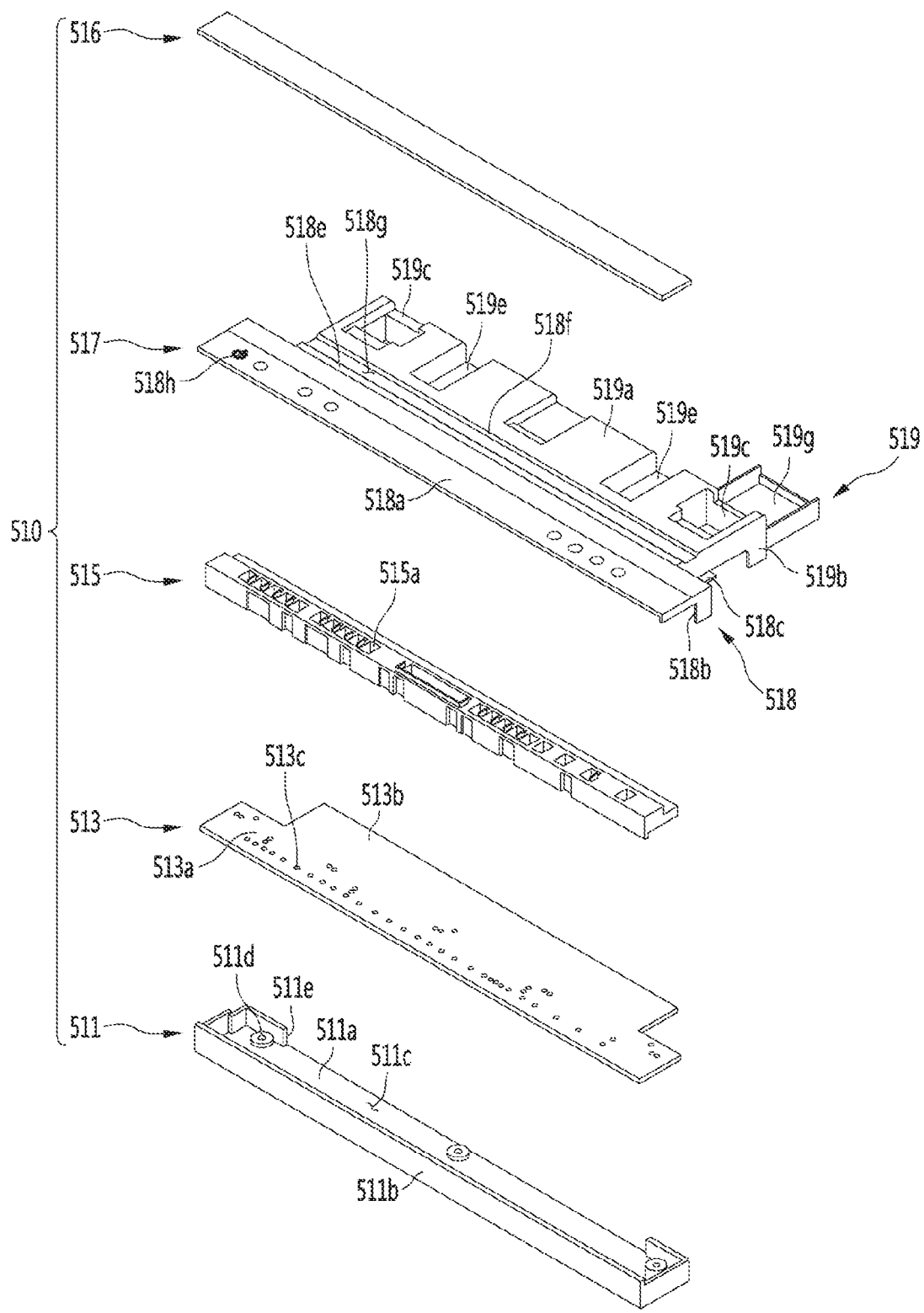
FIG. 12 is an exploded perspective view of a display module according to an embodiment of the present invention.
Figure 13:
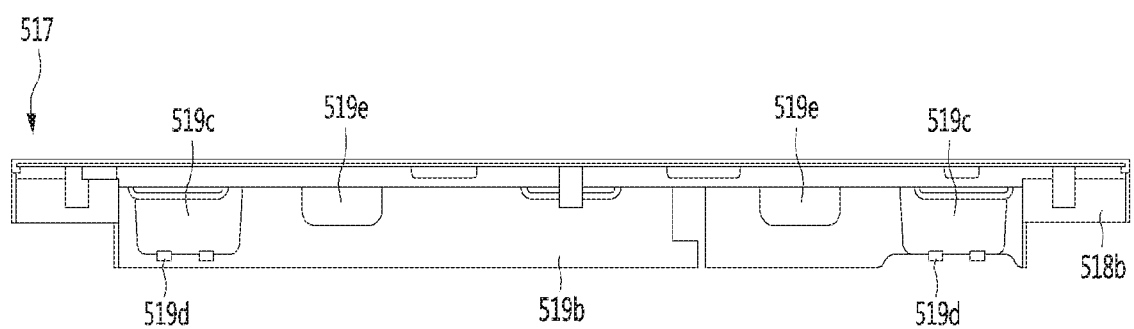
FIG. 13 is a front view illustrating a configuration of a display cover according to an embodiment of the present invention.

FIG. 12 is an exploded perspective view of the display module according to an embodiment of the present invention, FIG. 13 is a front view illustrating a configuration of the display cover according to an embodiment of the present invention, and FIG. 14 is a bottom view illustrating a configuration of the display cover according to an embodiment of the present invention.

Referring to FIGS. 12 to 14, the display module 510 according to an embodiment of the present invention includes a display 510a for displaying operation information of the air purifier 10, and a touch part 510b for inputting an operation command. The display module 510 is disposed on the front portion of the electric plate 460, and can slide forward and backward.

For example, when the display module 510 is applied to an external force from the front, the display module 510 can be moved backward and can be drawn in. When the external force is lost, the display module 510 can be moved forward and returned.

In detail, the display module 510 may include a display mounting portion 511, a display PCB 513, a reflector 515, a display cover 517, and a protective film 516. In the display module 510, the display mounting portion 511, the display PCB 513, the reflector 515, and the display cover 517 are sequentially assembled toward the upper side, and the display module 510 may be installed on the electric plate 460.

The display mounting portion 511 constitutes the lower portion of the display module 510 and can support the display PCB 513, the reflector 515, and the display cover 517.

The display mounting portion 511 is disposed on the upper surface of the front supporter 481 so as to be movable forward and backward. That is, the display mounting portion 511 may be installed to be supported by the front supporter 481.

For example, the display mounting portion 511 includes a mounting base 511a which is elongated in the horizontal direction and a mounting frame 511b which extends upward from the rim of the base 511a.

The mounting base 511a is formed to be flat so as to have a predetermined area, and the mounting frame 511b has a predetermined height, so that an installation space 511c may be provided in the display mounting portion 511.

In addition, a fastener 511d for selectively fixing the display module 510 to the display fixture 481c is provided on the lower surface of the display mounting portion 511.

At least one fastener 511d may be formed in the mounting base 511a and may be disposed at a position corresponding to the display fixture 481c.

As described above, the user can selectively prevent the display module 510 from sliding forward and backward by fastening the display fixture 481c and the fastener 511d by using the screw S.

The display mounting portion 511 may further include an opening 511e. The opening 511e may be formed such that a part of the mounting frame 511b is opened. For example, the opening 511e may be formed by opening the center portion of the mounting frame 511b corresponding to the rear end of the mounting base 511a by a predetermined length.

The display PCB 513 is formed to be long in the horizontal direction and installed in the installation space 511c. A plurality of LED elements 513c are provided on the upper surface of the display PCB 513. A plurality of LED elements can be disposed apart from each other and can emit light.

A part of the display PCB 513 is seated in the installation space 511c, and another portion may be disposed outside the installation space 511c through the opening 511e. In detail, the display PCB 513 includes a first part 513a disposed inside the installation space 511c and a second part 513b disposed outside the installation space 511c. The LED element may be disposed in the first part 513a.

The reflector 515 is installed on the upper surface of the display PCB 513. In detail, the reflector 515 may be disposed on the upper surface of the first part 513a, and may be fixed to the upper surface of the display PCB 513 through a double-sided tape or the like.

The reflector 515 may be configured to gently reflect or diffuse the light emitted from the LED device provided on the display PCB 513. At this time, the LED element 513c can irradiate light toward the reflector 515 upward, and the reflector 515 can diffuse the irradiated light upward. The reflector 515 includes reflector holes 515a formed at positions corresponding to the plurality of LED elements 513c.

The display cover 517 is coupled to the upper portion of the display mounting portion 511 so as to shield the installation space 511c. The display cover 517 covers a portion of the display PCB 513 exposed to the outside of the installation space 511c as well as the installation space 511c. Accordingly, the first and second parts 513a and 513b of the display PCB 513 may be shielded by the display cover 517.

With the structure of the display cover 517, water falling from the upper side of the display module 510 can be prevented from flowing into the installation space 511c side or flowing toward the display PCB 513 side.

The protective film 516 may be laminated on the upper surface of the display cover 517 corresponding to the upper side of the reflector 515.

The display cover 517 includes a first cover portion 518 and a second cover portion 519 extending rearward from the first cover portion 518.

The first cover portion 518 shields the installation space 511c. In addition, the first cover part 518 includes a first upper surface cover 518a coupled to the upper side of the display mounting part 511 and a first lower surface cover 518b extending downward from the rear end of the first upper surface cover 518a.

The first upper surface cover 518a has a quadrangular plate shape having a predetermined area and covers the open upper portion of the display mounting portion 511. The first upper cover 518a is provided with a display portion 518h on which characters or patterns displayed on the display 510a are printed.

The protective film 516 is laminated on the first upper cover 518a, and the first upper cover 518a on which the protective film 516 is laminated can constitute the display 510a.

That is, the first upper cover 518a may be exposed to the outside through the display groove 108.

The first rear cover 518b covers the opened rear portion of the display mounting portion 511. The second cover portion 519 extends rearward from the first cover portion 518 to cover the display PCB 513. That is, the second cover part 519 covers and protects the second part 513b of the display PCB 513.

The second cover portion 519 may be made of a transparent material. For example, the display cover 517 may be molded by using a transparent glass material, or may be injection-molded by using a transparent material.

In addition, the second cover portion 519 includes a second upper cover 519a extending rearward from the first rear cover 518b of the first cover portion 518, and a second rear cover 519b extending downward from the rear side of the second top cover 519a.

The second upper cover 519a may be disposed at a position lower than the first upper cover 518a. That is, the uppermost height of the second upper surface cover 519a may be lower than the uppermost height of the first upper surface cover 518a.

In detail, the display cover 517 includes steps 518e and 518f extending between the first upper cover 518a and the second upper cover 519a so as to have a difference in height. The steps 518e and 518f include a first step 518e extending downward from the first upper cover 518a and a second step 518f extending downward from the second top cover 519a. A cover flow passage 518g extending in the horizontal direction is formed between the first and second steps 518e and 518f.

That is, the upper surface of the display cover 517 may be configured to have a difference in height by the first and second steps 518e and 518f. With this configuration, the water dropped into the first upper cover 518a or the second upper cover 519a can flow into the cover passage 518g by the first and second steps 518e and 518f and can be discharged to the outside of the display cover 517.

The second upper cover 519a includes a first dent 519c. The first dent 519c is formed such that a part of the second top cover 519a is recessed downward. For example, the first dent 519c may be recessed at a predetermined depth from both sides of the second upper cover 519a. The pair of first dents 519c may be recessed at a position corresponding to the damper 478 in the second upper cover 519a.

A damper coupling portion 519d to which the damper 478 is coupled is formed on the lower side of the first dent 519c, that is, on the bottom surface of the first dent 519c.

The damper coupling portions 519d may be provided as a pair and extend downwardly from the bottom surface of the first dent 519c. The pair of damper coupling portions 519d may be spaced apart by a predetermined interval such that the damper gear 478c can extend downward through the space between the pair of damper coupling portions 519d.

When the damper 478 is coupled to the display module 510 by the damper coupling portion 519d, the moving speed of the display module 510 may be controlled while the damper 478 moves forward and backward along the damper guide 479.

The second upper cover 519a further includes a second dent 519e. The second dent 519e is formed such that a part of the second upper cover 519a is recessed downward. For example, the second dents 519e may be recessed from the second upper cover 519a at positions corresponding to the release prevention portions 476 and 477, respectively.

A guide slit 519f through which the screw 477a passes is formed on the bottom surface of the second dent 519e. The guide slit 519f is configured to extend from the bottom surface of the second dent 519e in the forward and backward directions. The fastening member 477 may be fastened to the fastening boss 478 after passing the guide slit 519f downward from above.

Since a diameter D1 of the washer 477b provided in the fastening member 477 is formed to be larger than a width D2 of the guide slit 519f, the lower surface of the washer 477b is brought into close contact with the bottom surface of the second dent 519e in a state where the fastening member 477 is fastened to the fastening boss 478.

Therefore, since the upward movement of the display module 510 can be restricted, it is possible to prevent the display module 510 from protruding upward in the process of moving the display module 510 forward and backward.

As a result, the plurality of dents 519c and 519e can guide the movable combination of the electric plate 460 and the display module 510.

The plurality of dents 519c and 519e can guide the display module 510 to be confined in the vertical direction and in both directions.

The plurality of dents 519c and 519e can guide the speed of the display module 510 to be adjusted in forward and backward directions.

The display cover 517 further includes a PCB seating part 519g for forming a space for seating the Wi-Fi PCB 570. The PCB seating portion 519g may be formed on the second cover portion 519.

In detail, the PCB seating portion 519g further extends rearward from the second cover portion 519. For example, the PCB seating part 519g may have a rectangular case shape with an opened upper portion such that the Wi-Fi PCB 570 is seated. When the display cover 517 is installed on the electric plate 460, the PCB seating portion 519g may be placed on the upper surface of the electric base 470.

The display cover 517 further includes a guide protrusion for stably supporting the forward and backward movement of the display module 510. The guide protrusion includes a first guide protrusion 519h. The first guide protrusion 519h is formed on the rear surface of the display cover 517. In detail, the first guide protrusion 519h may extend rearward from the rear cover 519b of the second cover portion 519 by a predetermined length.

The first guide protrusion 519h may be disposed at the center portion of the rear cover 519b of the second cover portion 519 with respect to the horizontal direction. The first guide protrusion 519h may be seated in the seating groove 473a of the first guide rib 473. Since the first guide protrusion 519h is supported by the inner surface of the seating groove 473a, the first guide protrusion 519h can guide the forward and backward movement and restrict the horizontal movement.

The guide protrusion may further include a second guide protrusion 518c. The second guide protrusions 518c are provided on both sides of the display cover 517, respectively. In detail, the second guide protrusion 518c may extend rearward from the rear cover 518b of the first cover portion 518 by a predetermined length.

The second guide protrusion 518c is disposed symmetrically with respect to both sides of the rear cover 518b of the first cover portion 518 so as to be seated in the seating groove 474a of the second guide rib 474. Since the second guide protrusion 518c is supported by the inner surface of the seating groove 474a, the second guide protrusion 518c can guide the forward and backward movement and restrict the horizontal movement.

The display cover 517 further includes a spring 518d provided on the outer circumferential surface of the second guide protrusion 518c. The spring 518d provides an elastic force for returning to the original position (forward) when the display module 510 is retracted rearward.

The spring 518d may be interposed between the first cover part 518 and the second guide rib 474. The front end of the spring 518d may be in contact with the rear cover 518b of the first cover portion 518 and the rear end of the spring 518d may be in contact with the second guide rib 474. For example, the spring 518d may include a compression coil spring.

The second guide protrusion 518c may be inserted into the spring 518d. That is, the spring 518d is disposed to surround the second guide protrusion 518c, thereby preventing the spring 518d from being detached or damaged in the process of deforming the spring 518d.

Figure 15:
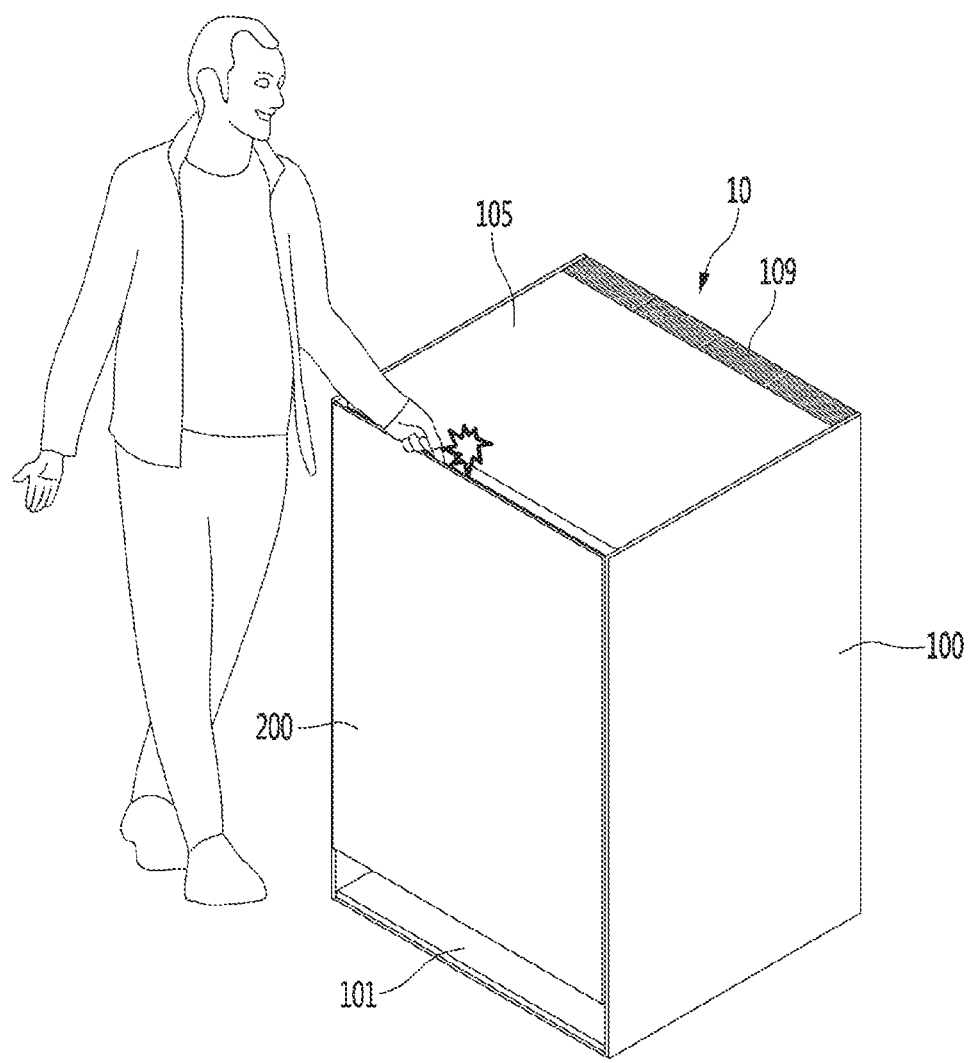
FIG. 15 is a view illustrating a state where a user's hand is caught in the air purifier according to an embodiment of the present invention.
Figure 16:
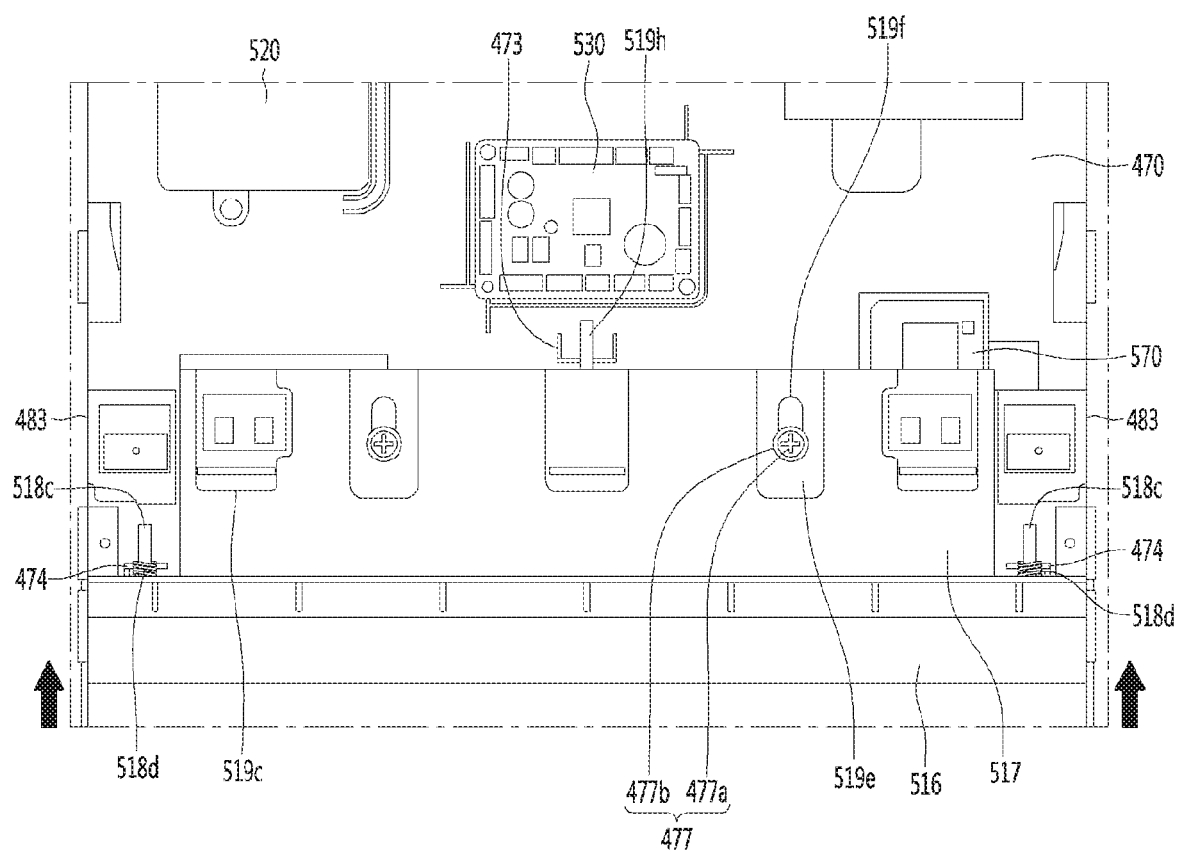
FIG. 16 is a plan view illustrating the display module moved backward according to an embodiment of the present invention.
Figure 17A:
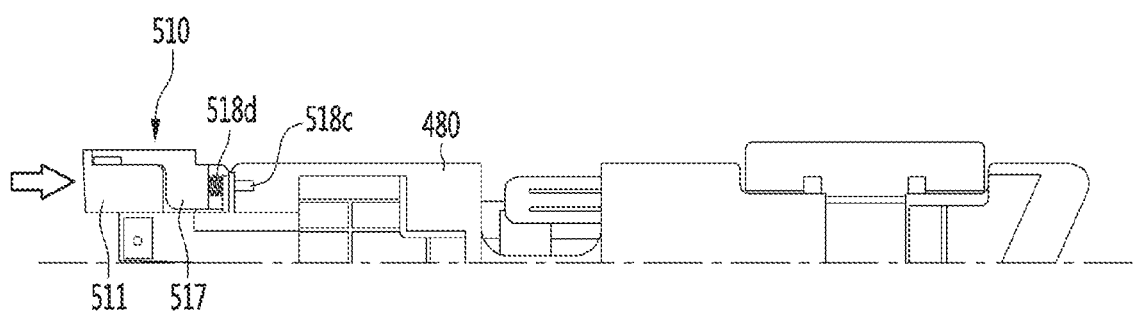
FIG. 17a is a side view illustrating the display module moved backward according to an embodiment of the present invention.
Figure 17B:
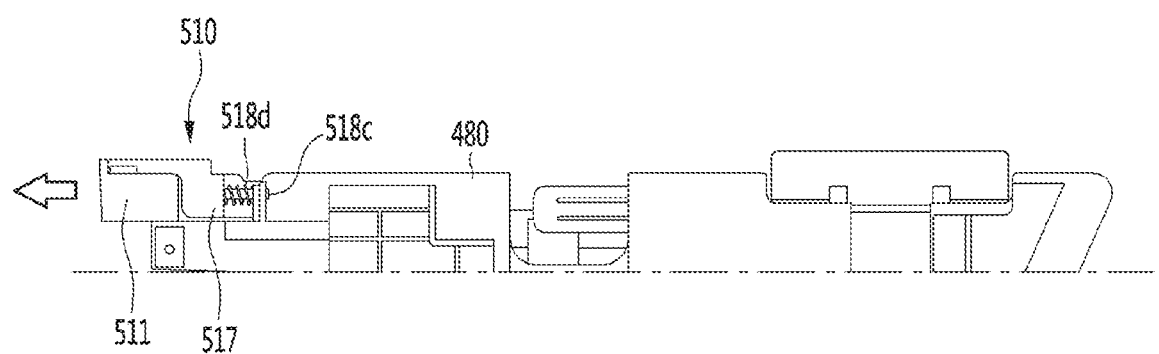
FIG. 17b is a view illustrating the display module moved forward according to an embodiment of the present invention.

FIG. 15 is a view illustrating a state where a user's hand is caught in the air purifier according to an embodiment of the present invention, FIG. 16 is a plan view illustrating the display module moved backward according to an embodiment of the present invention, FIG. 17a is a side view illustrating the display module moved backward according to an embodiment of the present invention, and FIG. 17b is a view illustrating the display module moved forward according to an embodiment of the present invention.

Referring to FIG. 15, when the user opens and closes the door 200, the user's hand may be caught between the door 200 and the display module 510. In this case, the user's hand may be impacted by the relatively heavy door 200 and may be injured.

In order to solve this problem, the display module 510 according to the embodiment of the present invention is configured to retract smoothly backward. When the door 200 is closed and the user's hand is separated from the display module 510, the display module 510 can be slowly returned to the front side. With this configuration, it is possible to prevent the door 200 or the display module 510 from strongly hitting the user's hand.

In detail, the operation of the display module 510 in forward and backward movement will be briefly described.

First, referring to FIG. 10, when the door assembly 200 of the air purifier 10 is closed, the display module 510 is supported on the upper side of the front supporter 481.

In detail, the display mounting portion 511 is placed on the second part 481b of the front supporter 481, and the first and second guide protrusions 519h and 518c provided on the display cover 517 are supported by the seating grooves 473a and 474a of the first and second guide ribs 473 and 474, respectively.

The spring 518d is provided on the outer circumferential surface of the second guide rib 474 and the spring 518d is maintained in a tensioned state between the display cover 517 and the second guide rib 474.

On the other hand, referring to FIGS. 16 and 17A, when the user hits the display module 510 in the process of opening and closing the door assembly 200, the display module 510 can be smoothly moved backward. At this time, the spring 518d is compressed, and the restoring force is accumulated accordingly. The damper 478 is smoothly moved backward without resistance along the damper guide 479.

On the other hand, as illustrated in FIG. 17B, when the user's hand is separated from the display module 510, the display module 510 can be moved forward by the restoring force accumulated in the spring 518d. The spring 518d may be tensioned. The damper gear 478c is slowly moved forward along the damper guide 479 due to the resistance of the viscous fluid filled in the damper 478. As a result, the speed at which the display module 510 is moved forward is decelerated.

Therefore, in the process of closing the door assembly 200, the user's hand is prevented from being caught between the display module 510 and the door assembly 200, and the display module 510 is prevented from strongly hitting the user's hand in the process of returning, thereby improving the stability.

Figure 18:
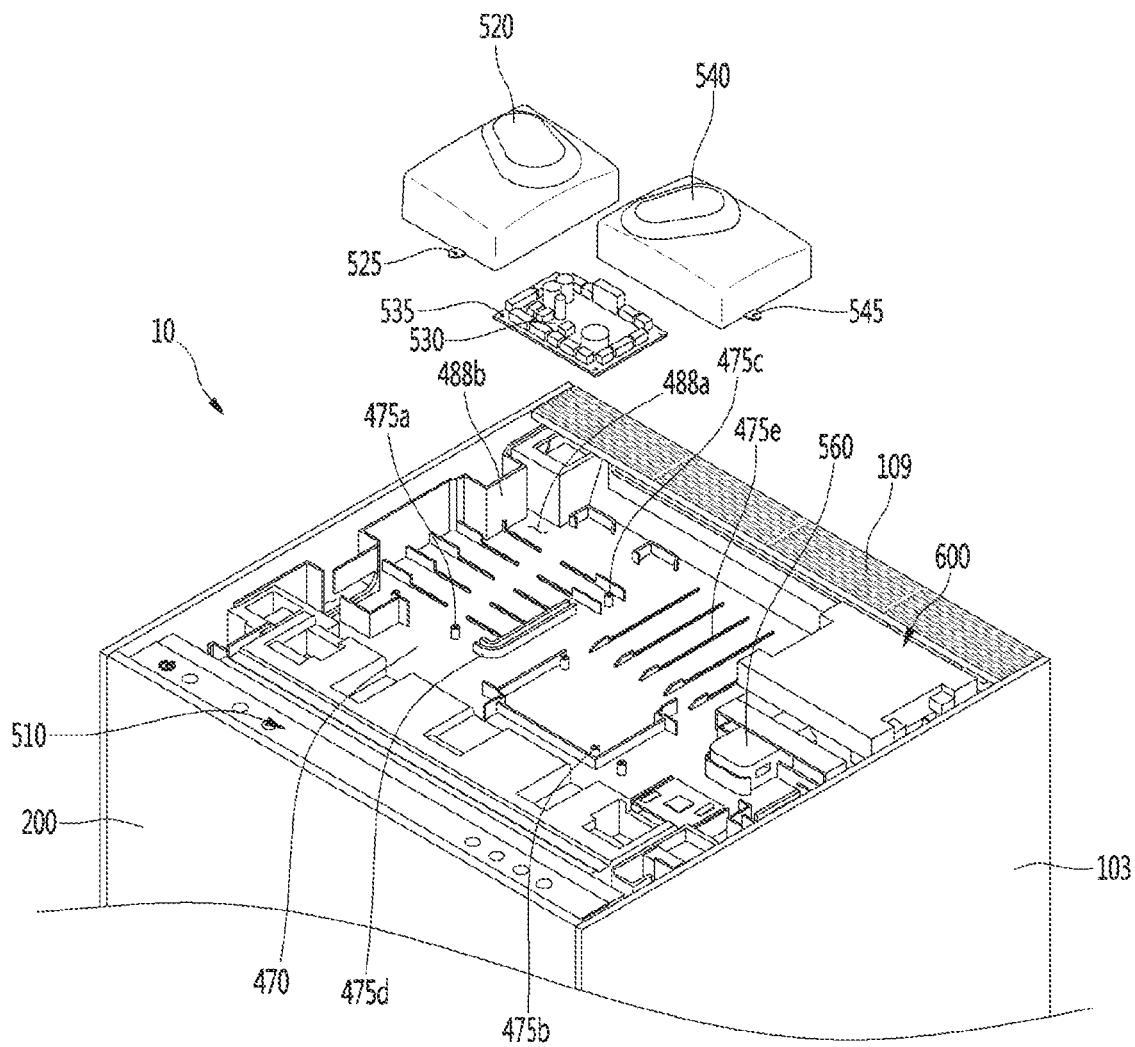
FIG. 18 is an exploded perspective view illustrating a configuration of a plurality of PCBs and an electric plate according to an embodiment of the present invention.
Figure 19:
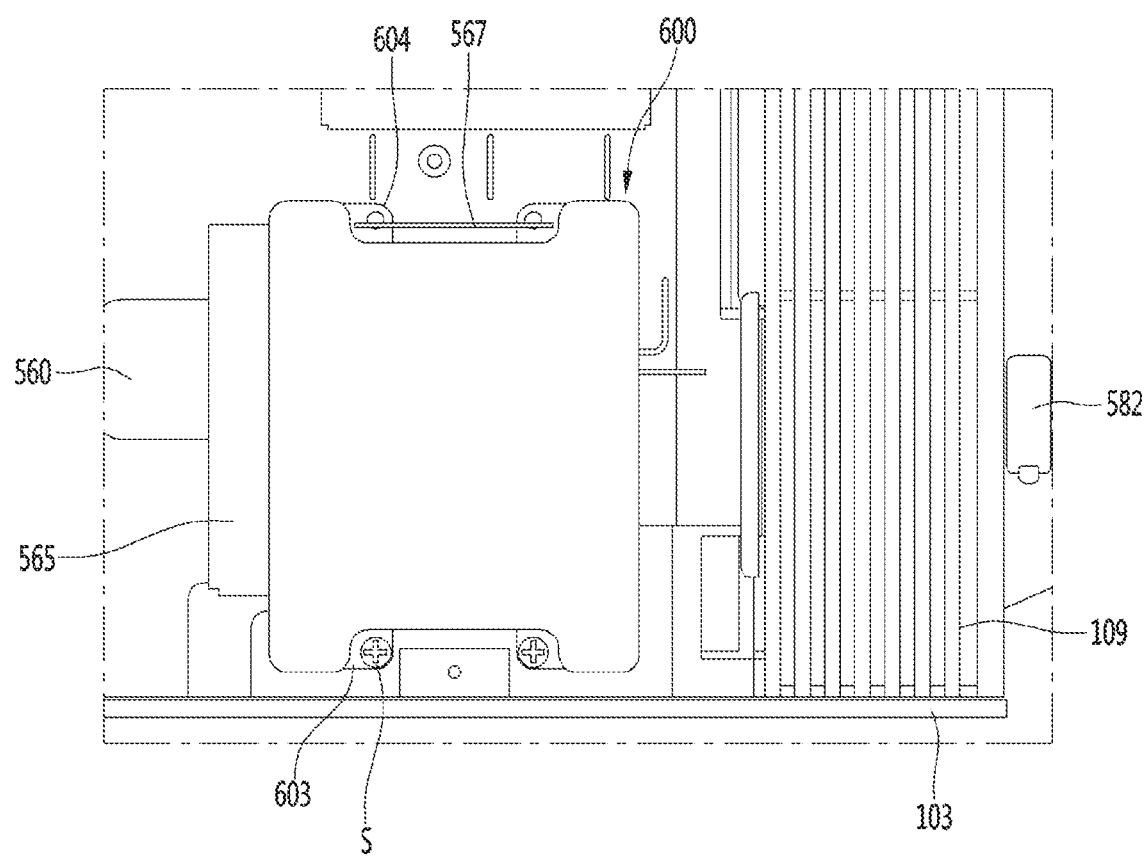
FIG. 19 is a plan view illustrating a state where a wireless charging module according to an embodiment of the present invention is coupled to the electric plate.
Figure 20:
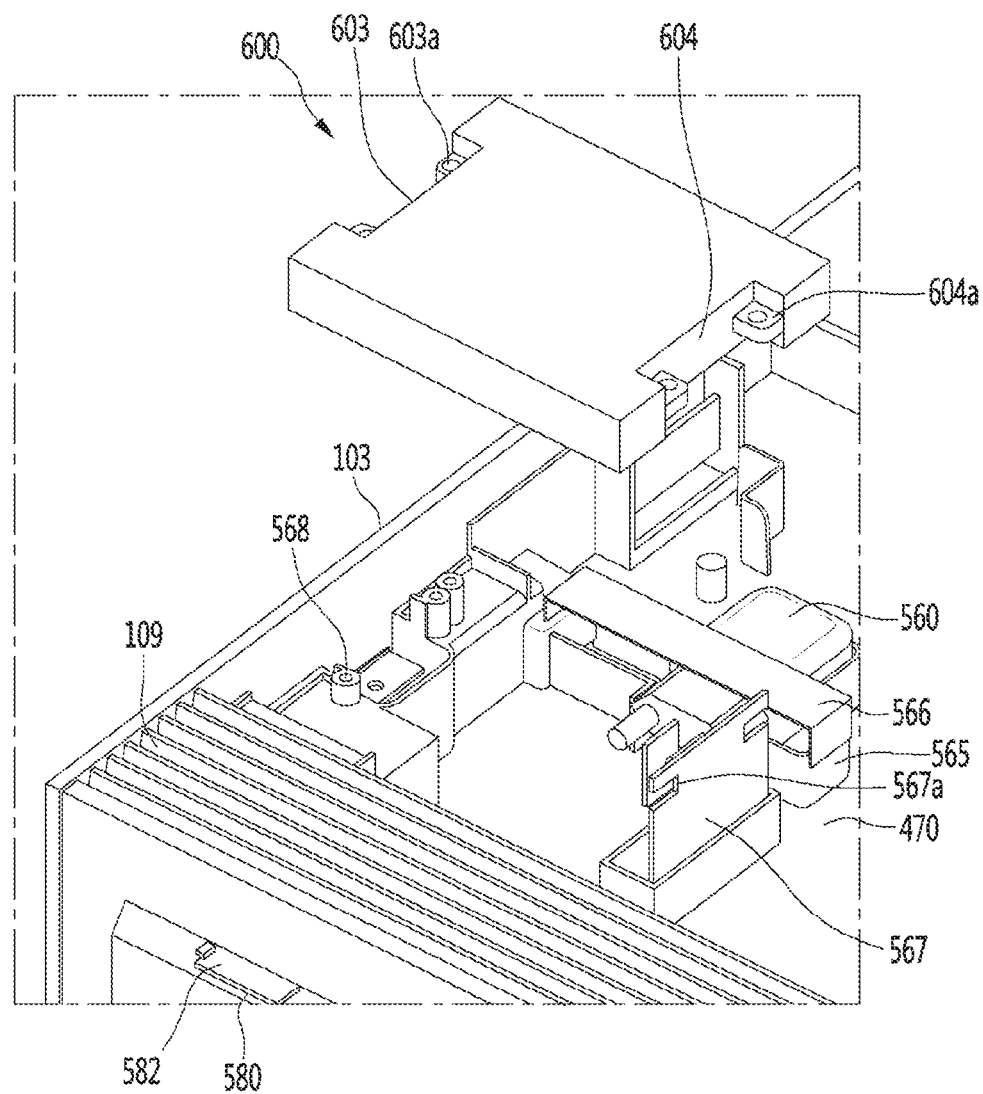
FIG. 20 is an exploded perspective view illustrating a configuration of a wireless charging module and an electric plate according to an embodiment of the present invention.
Figure 21:
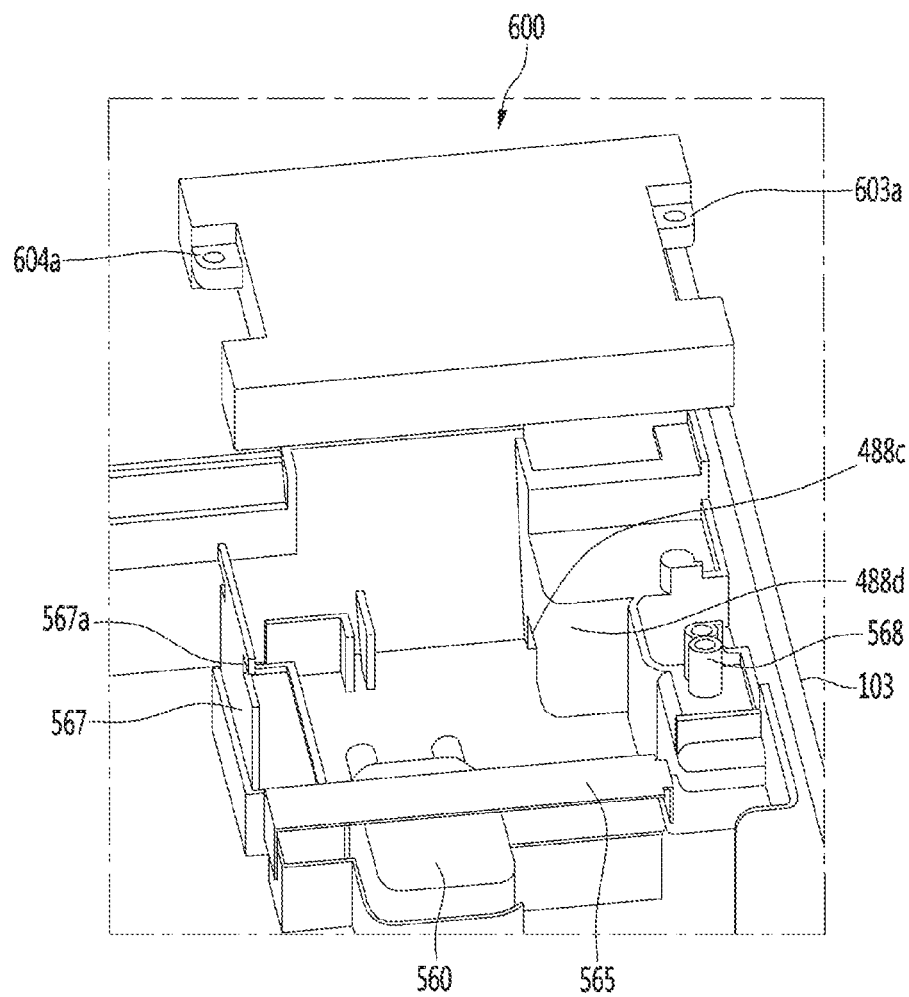
FIG. 21 is an exploded perspective view illustrating a drain port of the electric plate according to an embodiment of the present invention.
Figure 22:
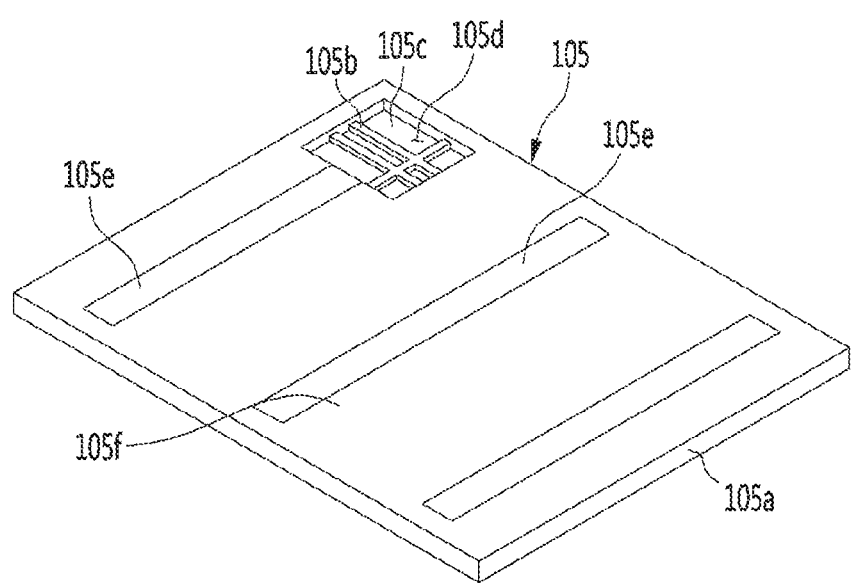
FIG. 22 is a bottom view of an upper panel according to an embodiment of the present invention.
Figure 23:
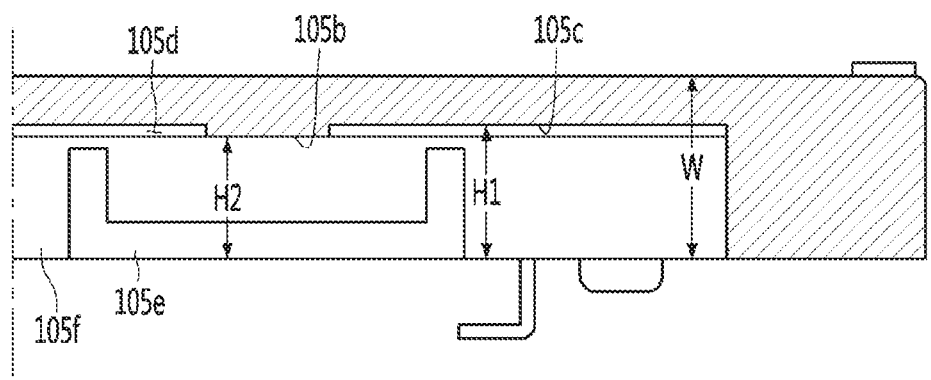
FIG. 23 is a sectional view taken along line A-A' of FIG. 3.

FIG. 18 is an exploded perspective view illustrating a configuration of a plurality of PCBs and an electric plate according to an embodiment of the present invention, FIG. 19 is a plan view illustrating a state where a wireless charging module according to an embodiment of the present invention is coupled to the electric plate, FIG. 20 is an exploded perspective view illustrating a configuration of a wireless charging module and an electric plate according to an embodiment of the present invention, FIG. 21 is an exploded perspective view illustrating a drain port of the electric plate according to an embodiment of the present invention, FIG. 22 is a bottom view of an upper panel according to an embodiment of the present invention, and FIG. 23 is a sectional view taken along line A-A' of FIG. 3.

Referring to FIGS. 18 to 23, the electric components according to the embodiment of the present invention may include a display module 510, a power PCB 520, a main PCB 530, a sub PCB 540, a wireless charging module 600, a wired charging module 560, and a Wi-Fi PCB 570.

The plurality of PCBs 510, 520, 530, 540, and 570 may be defined as a printed circuit board.

The PCBs 510, 520, 530, 540 and 570 and the charging modules 550 and 560 may be installed on the upper surface of the electric base 470. In detail, the power PCB 520 includes a first fastening portion 525, and the electric base 470 includes a first boss 475a coupled to the first fastening portion 525 through a fastening member. A plurality of first fastening portions 525 may be provided on both sides of the power PCB 520.

The main PCB 530 includes a second fastening portion 535, and the electric base 470 includes a second boss 475b coupled to the second fastening portion 535 through a fastening member. A plurality of second fastening portions 535 may be provided on both sides of the main PCB 530.

The sub PCB 540 includes a third fastening portion 545, and the electric base 470 includes a third boss 475c coupled to the third fastening portion 545 through a coupling member. A plurality of third fastening portions 545 may be provided on both sides of the sub PCB 540.

The electric base 470 further includes an installation rib 475d surrounding the PCB 510, 520, 530, 540, and 570. For example, a plurality of the installation ribs 475d may be provided. Some installation ribs may surround the outside of the power PCB 520, and other installation ribs may surround the outside of the main PCB 530. That is, the PCBs 510, 520, 530, 540, and 570 are positioned inside the installation ribs 475d, and even if the coupling between the coupling parts and the boss is released, the vibration generated in the air purifier 10 can prevent the installation position from being deviated.

The electric base 470 further includes a support rib 475e which supports the lower portions of the PCBs 510, 520, 530, 540, and 570 and protrudes upward from the electric base 470. For example, a plurality of the support ribs may be provided. Some support ribs may support the lower surface of the power PCB 520, and other support ribs may support the lower surface of the sub PCB 540.

As described above, since the PCBs 510, 520, 530, 540, and 570 may be spaced upward from the upper surface of the electric base 470 by the support ribs 475e, it is possible to prevent the fluid present in the electric base 470 from acting on the PCB.

Drain ports 488a and 488c for discharging the fluid, which may be present in the electric base 470, downward are provided in the electric unit 450. The drain ports 488a and 488c may be formed in the side supporters 483 provided on both sides of the electric base 470.

The user can place a container, which contains the fluid (water or beverage) on the upper panel 105 of the air purifier 10. When the container falls down, the fluid can flow to the bottom of the upper panel 105 and collect on the electric base 470. Therefore, the collected fluid needs to be discharged from the electric base 470 in order to perform the smooth function of the electric unit 450. For this purpose, drain ports 488a and 488c are formed in this embodiment.

In detail, the drain ports 488a and 488c include a first drain port 488a formed in one side extension portion of the side supporter 483 and a second drain port 488c formed in the other side extension portion thereof. The one side extension portion and the other side extension portion form surfaces facing each other.

The side supporter 483 includes a first drain port bracket 488b forming the first drain port 488a. The first drain port 488a is formed to penetrate the first drain port bracket 488b in the horizontal direction and may be disposed adjacent to the power PCB 520. The fluid discharged through the first drain hole 488a may drop downward along one side of the body frame 110.

The side supporter 483 includes a second drain port bracket 488d forming the second drain port 488c. The second drain port 488c is formed to penetrate the second drain port bracket 488d in the horizontal direction and may be disposed adjacent to the wireless charging module 600. The fluid discharged through the second drain port 488c may drop downward along the other side of the body frame 110.

The wireless charging module 600 may be disposed on one side of the rear portion of the electric base 470. The wireless charging module 600 may be positioned in front of the discharging unit 109.

As described above, the wireless charging module 600 may be located below the first quadrant 105h of the upper panel 105. That is, the sheet (refer to S in FIG. 2) installed on the first quadrant 105h of the upper panel 105 may be positioned on the upper side of the wireless charging module 600.

The wired charging module 560 may be positioned adjacent to the front of the wireless charging module 600.

A wired module bracket 565 for supporting the wired charging module 560 is provided below the wired charging module 560, and a wired module clip 566 for pressing the wired charging module 560 downward is provided on the wired charging module 560. The wired module bracket 565 protrudes upward from the electric base 470, and both side portions of the wired module clip 566 are bent downward and are coupled to the wired module bracket 565.

That is, the wired charging module 56 can be stably fixed between the wired module bracket 565 and the wired module clip 566.

A USB port 580 electrically connected to the wired charging module 560 is provided on the rear side of the cabinet 100. A USB cover 582 may be coupled to the USB port 580. The electronic device may be connected to the USB port 580 and may be charged by wire.

The wireless charging module 600 may have a low-height hexahedral shape. A first module side 603 having a wireless module coupler 603a is formed on one side of the wireless charging module 600. The first module side 603 is recessed on the right side of the wireless charging module 600. Since the wireless module coupler 603a is provided in the first module side 603, the wireless module coupler 603a may not protrude from the right side of the wireless charging module 600.

The electric base 470 is provided with a wireless module boss 568 coupled to the wireless module coupler 603a. The wireless module boss 568 can protrude upward from the electric base 470 and can be fastened to the wireless module coupler 603a by a screw S.

A second module side 604 having a fitting portion 604a is formed on the other side of the wireless charging module 600. The second module side 604 is recessed on the left side of the wireless charging module 600. Since the fitting portion 604a is provided on the second module side 604, the fitting portion 604a may not protrude beyond the left side of the wireless charging module 600. For example, the fitting portion 604a may be formed to protrude from two vertical surfaces of the second module side 604, The electric base 470 is provided with a wireless module bracket 567 having a groove 567a into which the fitting portion 604a is inserted. The wireless module bracket 567 protrudes upward from the electric base 470, and the groove 567a may be recessed on both sides of the upper portion of the wireless module bracket 567.

The wireless charging module 600 may be installed in the electric base 470 in such a manner that the fitting portion 604a is disposed to be inserted into the groove 567a and the wireless module coupler 603a is fastened to the wireless module boss 568. The heights of the wireless module boss 568 and the wireless module bracket 567 protruding from the electric base 470 may be equal to each other.

The heights of the wireless module boss 568 and the wireless module bracket 567 protruding from the electric base 470 may be greater than the protruding height of the support rib 475e. Therefore, the installation height of the wireless charging module 600 may be greater than that of the other PCBs 520, 530, and 540. For example, the upper surface of the wireless charging module 600 is in contact with the bottom surface of the upper panel 105, but the upper surfaces of the other PCBs 520, 530, and 540 may be spaced downward from the bottom surface of the upper panel 105.

Since the wireless charging module 600 is relatively positioned above, the distance between the wireless charging module 600 and the mobile device M held on the upper panel 105 may be formed to be small. Thus, the wireless charging efficiency can be improved.

A charging groove 105c recessed upward at a position corresponding to the wireless charging module 600 is formed in the bottom surface 105f of the upper panel 105.

The position of the charging groove 105c is formed on the upper side of the wireless charging module 600. For example, the charging groove 105c may have an area equal to or larger than the upper surface area of the wireless charging module 600.

The charging groove 105c may form a heat dissipating space 105c for dissipating heat of the wireless charging module 600.

Referring to FIG. 23, a part of the upper panel 105 on which the charging groove 105c is formed may have a relatively small thickness (W-H1) in the vertical direction. Accordingly, the distance between the mobile device M and the wireless charging module 600 may be relatively shortened to improve the wireless charging efficiency.

The distance between the centers of the mobile device M and the wireless charging module 600 may preferably be 10 mm or less. When the distance exceeds 10 mm, the wireless charging efficiency of the mobile device M may be drastically deteriorated.

In addition, the mobile device M may be equipped with a separate mobile case, the thickness thereof may be increased. Therefore, it is preferable that the thickness of the upper panel 105 in which the wireless charging module 600 is corresponded is formed to a minimum thickness, considering the mobile device M equipped with the mobile case. The criteria of the minimum thickness will be described later.

For example, the thickness W of the upper panel 105 may be set to 15 mm. The thickness W-H1 of the upper panel 105 on which the charging groove 105c is formed may be set to 4 mm. The thickness (W-H2) of the upper panel 105 on which a pressurizing rib 105b to be described later is formed may be set to 5 mm. Accordingly, the distance between the wireless charging module 600 and the mobile device M may have a value between a minimum of 5 mm and a maximum of 10 mm Therefore, the phenomenon that the wireless charging efficiency is reduced can be prevented.

As described above, it may be advantageous to form the charging groove 105c as deep as possible from the bottom surface 105f of the upper panel 105 so as to improve the wireless charging efficiency. That is, the charging groove 105c may be formed to be recessed as much as possible from the bottom surface 105f of the upper panel.

However, the upper panel 105 may be made of wood. The degree of thermal deformation, fracture strength, durability, lifetime, and the like of the wood may change depending on the thickness. Therefore, the upper panel 105 can set a minimum thickness that satisfies the minimum criteria such as the degree of thermal deformation, fracture strength, and the durability.

In one example, the minimum thickness may be determined to be a value between 25% and 30% of the total thickness W. That is, when the total thickness W of the upper panel 105 is 15 mm, the minimum thickness of the charging groove 105c is preferably 4 mm As a result, the upper panel 105 on which the charging groove 105c is formed can be formed to a thickness that satisfies the above-mentioned minimum criterion and maximizes the distance according to the wireless charging efficiency.

The upper panel 105 may be formed with a pressurizing rib 105b that contacts the upper surface of the wireless charging module 600 and supports the wireless charging module 600.

The pressurizing rib 105b may be formed to protrude downward from the charging groove 105c. For example, the pressurizing ribs 105b may extend downward from the bottom surface 105f of the upper panel 105, on which the charging groove 105c is formed, by a predetermined length. The predetermined length may be set to 1 mm The predetermined length is proportional to the size of the heat dissipation space 105d to be described later.

The pressurizing ribs 105b may extend to have a shape crossing in the horizontal direction and in the forward and backward directions. For example, the pressurizing rib 105b may protrude in a '+' shape.

That is, the pressurizing rib 105 may form the heat dissipating space 105d. For example, the charging groove 105c may be constituted by the pressurizing rib 105 and the heat dissipating space 105d which is a space formed by the pressurizing rib 105.

Accordingly, the pressurizing rib 105b can effectively pressurize the wireless charging module 600 to fix the wireless charging module 600.

On the other hand, the charging groove 105c may form the heat dissipating space 105d capable of dissipating heat generated by the operation of the wireless charging module 600.

The heat dissipation space 105d may be defined as the space between the bottom surface 105f of the upper panel and the wireless charging module 600 separated by the pressurizing rib 105b.

The heat dissipation space 105d can prevent the upper panel 105 from being deformed or damaged due to heat generated in the wireless charging module 600 and the mobile device M.

In addition, the heat dissipation space 105d can prevent the temperature of the wireless charging module 600 from being excessively increased.

Figure 24:
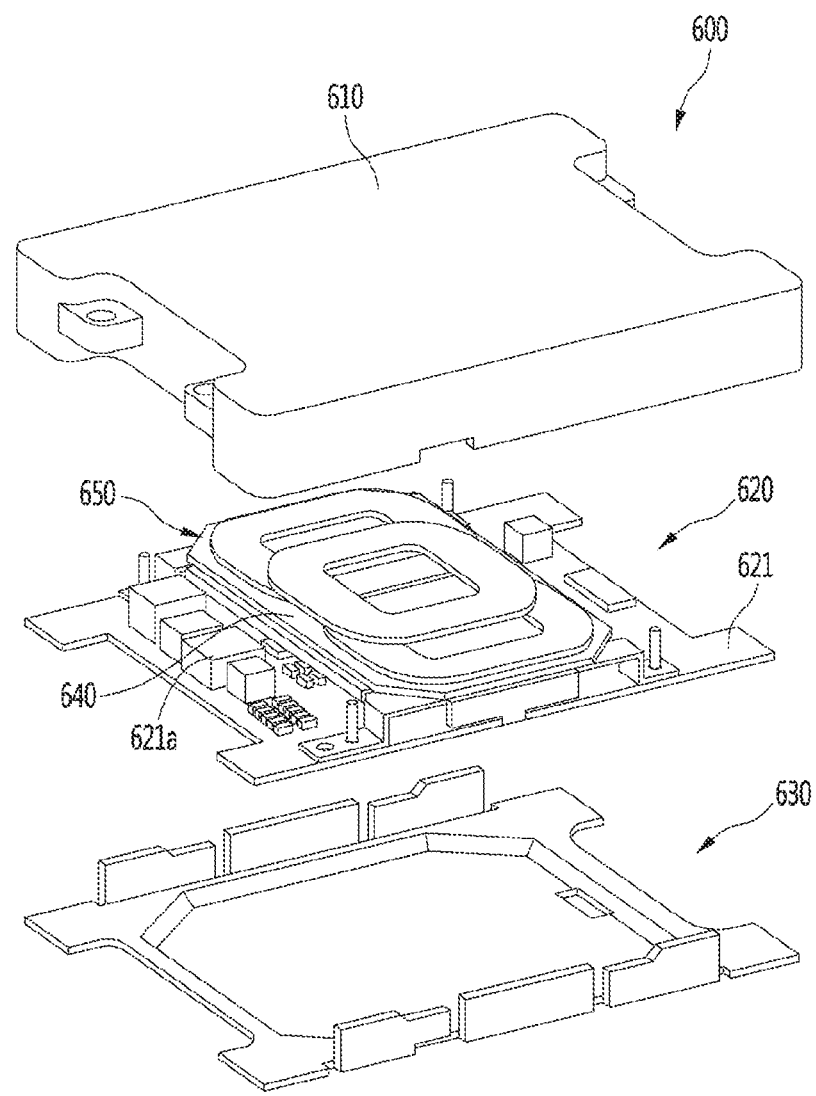
FIG. 24 is an exploded perspective view illustrating a configuration of a wireless charging module according to an embodiment of the present invention.
Figure 25:
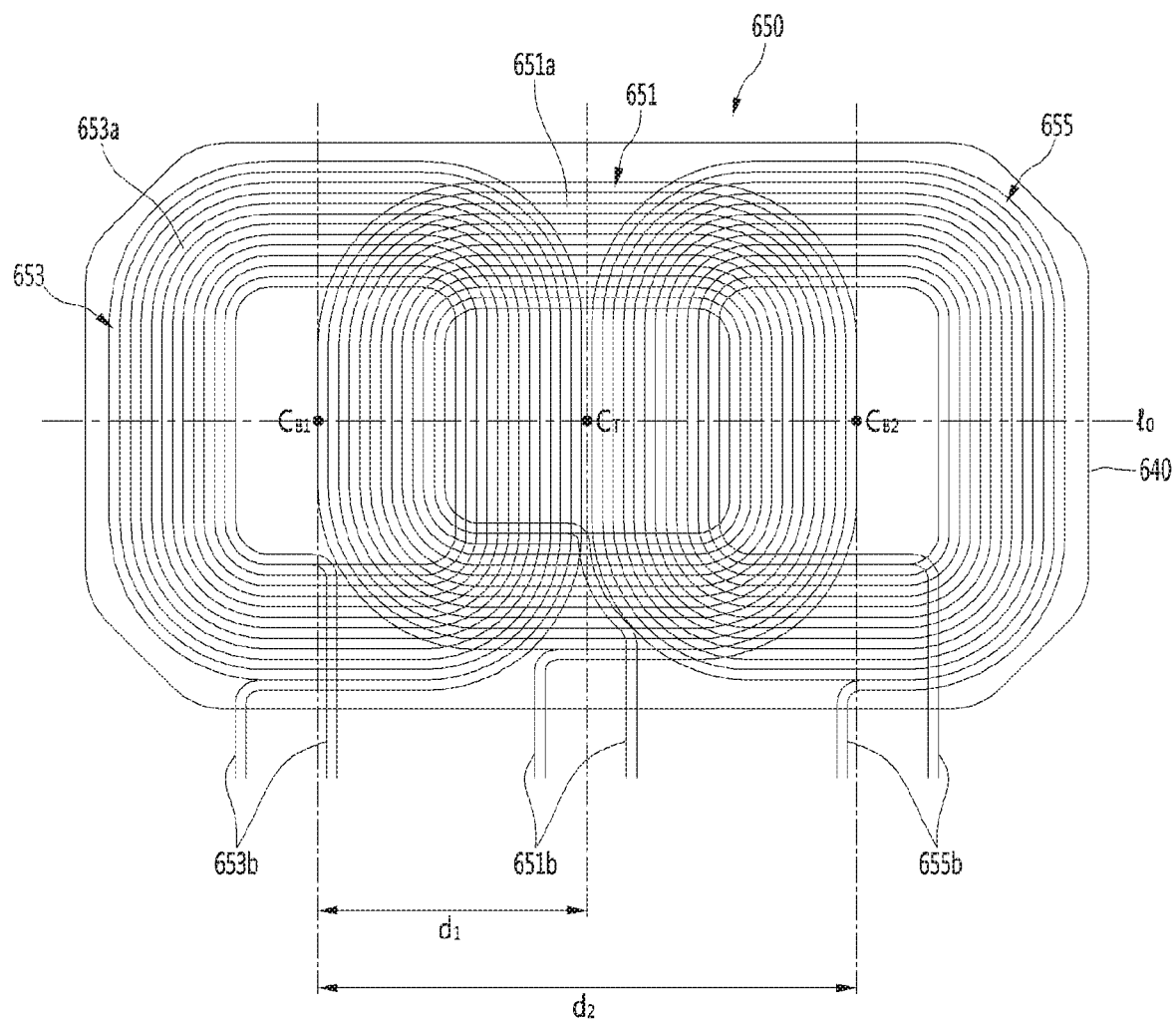
FIG. 25 is a view illustrating a configuration of a coil assembly according to an embodiment of the present invention.
Figure 26:
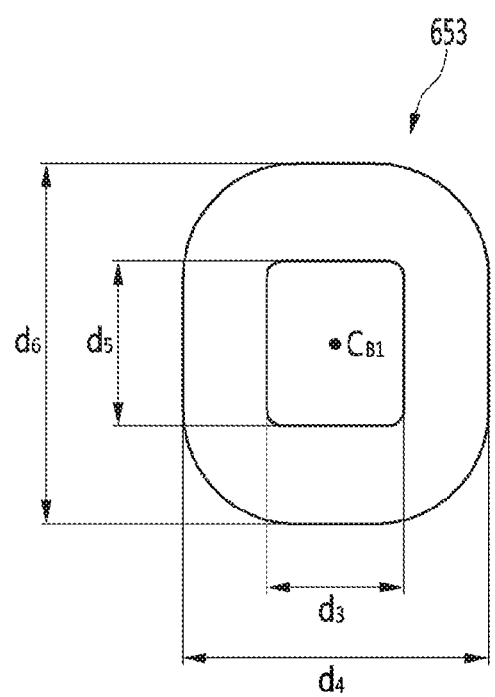
FIG. 26 is a view illustrating a configuration of a bottom coil according to an embodiment of the present invention.
Figure 27:
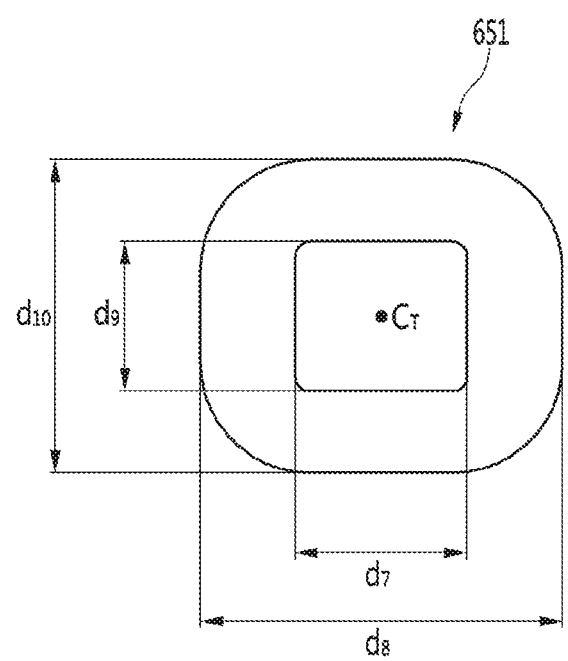
FIG. 27 is a view illustrating a configuration of a top coil according to an embodiment of the present invention.
Figure 28:
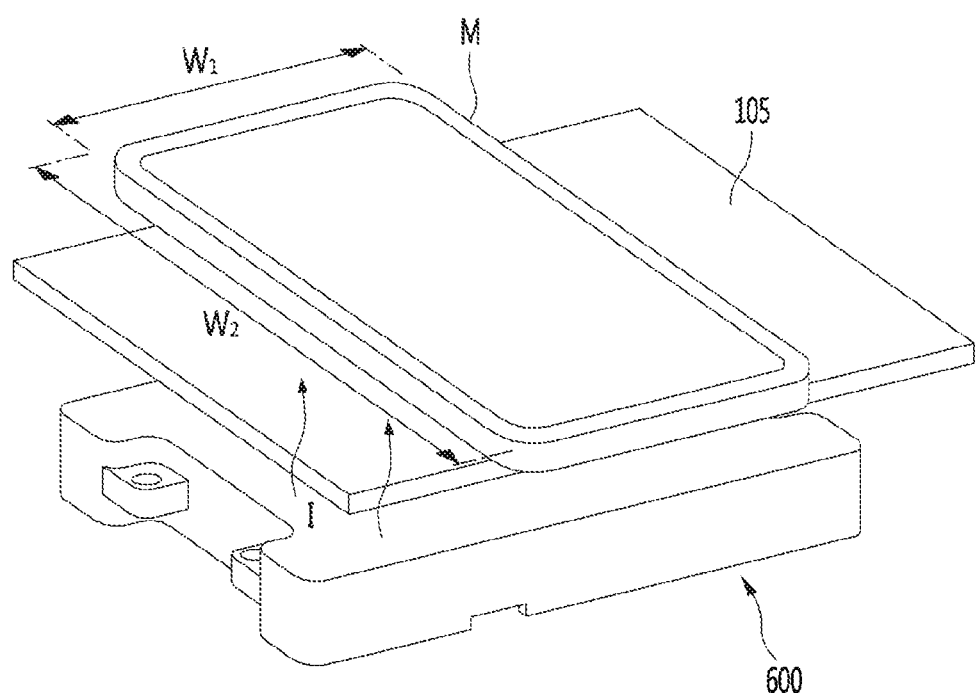
FIG. 28 is a schematic view illustrating a state where a mobile device on an upper side of an upper panel and wireless charging is performed according to an embodiment of the present invention.

FIG. 24 is an exploded perspective view illustrating a configuration of the wireless charging module according to an embodiment of the present invention, FIG. 25 is a view illustrating a configuration of the coil assembly according to an embodiment of the present invention, FIG. 26 is a view illustrating a configuration of a bottom coil according to an embodiment of the present invention, FIG. 27 is a view illustrating a configuration of the top coil according to an embodiment of the present invention, and FIG. 28 is a schematic view illustrating a state where a mobile device is mounted on an upper side of an upper panel and wireless charging is performed according to an embodiment of the present invention.

Referring to FIG. 24, the wireless charging module 600 according to an embodiment of the present invention includes a module body 620 having a coil assembly 650, a lower case 630 provided below the module body 620, and an upper case 610 provided above the module body 620. For example, the lower case 630 may be made of a metal material (for example, aluminum), and the upper case 610 may be made of a plastic material.

The module body 620 includes a module PCB 621 having a plurality of power devices 621a and the coil assembly 650 installed on the module PCB 621.

In detail, a shielding portion 640 is provided on the module PCB 621, and the coil assembly 650 is provided on the shielding portion 640. The shielding portion 640 limits a downward transfer of a magnetic field.

Referring to FIG. 25, the coil assembly 650 includes three coils for converting a current into a magnetic flux. The three coils may operate with a secondary coil included in the mobile device M. The secondary coil of the mobile device M may be configured to convert the magnetic flux into an electromotive force.

In detail, the coil assembly 650 includes two bottom coils 653 and 655 disposed on the upper surface of the shielding portion 640 and one top coil 651 disposed on the upper sides of the two bottom coils 653 and 655.

The two bottom coils 653 and 655 include first and second bottom coils 653 and 655 aligned in the forward and backward directions of the electric base 470. The forward and backward directions of the electric base 470 may correspond to the longitudinal direction of the wirelessly-charged mobile device M (see FIG. 28).

The first and second bottom coils 653 and 655 may have the same configuration and shape. Therefore, the description of the configuration of the first bottom coil 653, which will be described below, is equally applicable to the second bottom coil 655 as well.

The first bottom coil 653 may be configured such that a bottom coil turn 653a, which means one coil wire, is wound by a plurality of turns. The first bottom coil 653 may have a rectangular shape, a ring shape, or a donut shape with an empty interior. The width of the first bottom coil 653 in the horizontal direction may be greater than the width thereof in the longitudinal direction with respect to the electric base 470.

In the drawing, the center of the first bottom coil 653 is indicated as CB1. The center of the second bottom coil 655 is indicated by CB2.

The diameter of the bottom coil turn 653a may be about 0.07 mm to 0.09 mm. In one example, the first bottom coil 653 may be configured to include a bottom coil turn 653a arranged in 12 layers in a radial direction. That is, the bottom coil turn 653a may be wound by 12 turns to constitute the bottom coil 653.

The coil assembly 650 further includes two first bottom coil ends 653b constituting both ends of the bottom coil turn 653a. The first bottom coil end 653b may be electrically connected to the module PCB 621.

The coil assembly 650 further includes two second bottom coil ends 655b constituting both ends of the bottom coil turn of the second bottom coil 655. The second bottom coil end 655b may be electrically connected to the module PCB 621.

The top coil 651 may be configured such that a top coil turn 651a, which means one coil wire, is wound by a plurality of turns. The top coil 651 may have a rectangular shape, a ring shape, or a donut shape with an empty interior. The width of the top coil 651 in the forward and backward directions may be greater than the width thereof in the left and right directions with respect to the electric base 470. In the drawing, the center of the top coil 651 is indicated by CT.

The diameter of the top coil turn 651a may be in the range of about 0.07 mm to 0.09 mm. In one example, the top coil 651 may be configured to include a top coil turn 651a that is arranged in 12 layers in a radial direction. That is, the top coil turn 651a may be wound by 12 turns to constitute the top coil 651.

The coil assembly 650 further includes two top coil ends 651b constituting both end portions of the top coil turn 651a. The top coil end 651b may be electrically connected to the module PCB 621.

The first and second bottom coils 653 and 655 may be arranged adjacent to each other in the longitudinal direction and may be arranged not to overlap each other. A distance d2 between the center CB1 of the first bottom coil 653 and the center CB2 of the second bottom coil 655 may be about 42 mm to 50 mm The top coil 651 may be disposed so as to overlap the first and second bottom coils 653 and 655. The top coil 651 may be disposed perpendicular to the first and second bottom coils 653 and 655. Therefore, the width of the top coil 651 in the forward and backward direction is formed to be greater than the lateral width thereof, and the widths of the first and second bottom coils 653 and 655 in the horizontal direction may be greater than the width thereof in the forward and backward directions.

When defining an extension line 1o connecting the center CB1 of the first bottom coil 653 and the center CB2 of the second bottom coil 655, the center CT of the top coil 651 may be positioned on the extension line 1o.

The distance between the center CB1 of the first bottom coil 653 and the center CT of the top coil 651 or the distance between the center CB2 of the second bottom coil 655 and the center CT of the top coil 651 can be formed in the range of about 21 mm to 25 mm.

Referring to FIG. 26, with reference to the center CB1 of the first bottom coil 653, the width d5 of the inner surface of the first bottom coil 653 in the horizontal direction is in the range of 19 mm to 21 mm, and the width d3 in the forward and backward directions can be formed in the range of 18 mm to 20 mm.

The width d5 of the outer surface of the first bottom coil 653 in the horizontal direction is in the range of 48 mm to 50 mm, and the width d4 thereof in the forward and backward directions can be formed in the range of 47 mm to 49 mm.

Referring to FIG. 27, with reference to the center CT of the top coil 651, the width d9 of the inner surface of the top coil 651 in the horizontal direction is formed in the range of 20 mm to 22 mm, and the width d7 thereof in the forward and backward directions can be formed in the range of 24.5 mm to 26.5 mm.

The width d10 of the outer surface of the top coil 651 in the horizontal direction is in the range of 45 mm to 47 mm, and the width d8 thereof in the forward and backward directions can be formed in the range of 48.5 mm to 50.5 mm.

Due to the formation of the size of the top coil 651 and the size of the first and second bottom coils 653 and 655, the top coil 651 is disposed to overlap the first and second bottom coils 653 and 655, and the center of each of the coils 651, 653, and 655 may be arranged so as to be aligned in forward and backward directions.

As illustrated in FIG. 28, the mobile device M in which the vertical width W2 is greater than the horizontal width W1 can be held on the upper panel 105. At this time, in order to charge the mobile device M, the holding direction of the mobile device M may be determined such that the vertical direction of the mobile device M corresponds to the forward and backward directions of the upper panel 105.

When the wireless charging of the mobile device M is started, the magnetic flux generated in the coil assembly 650 may be transmitted to the secondary coil of the mobile device M. The secondary coil converts the magnetic flux into an electromotive force.

Figure 29:
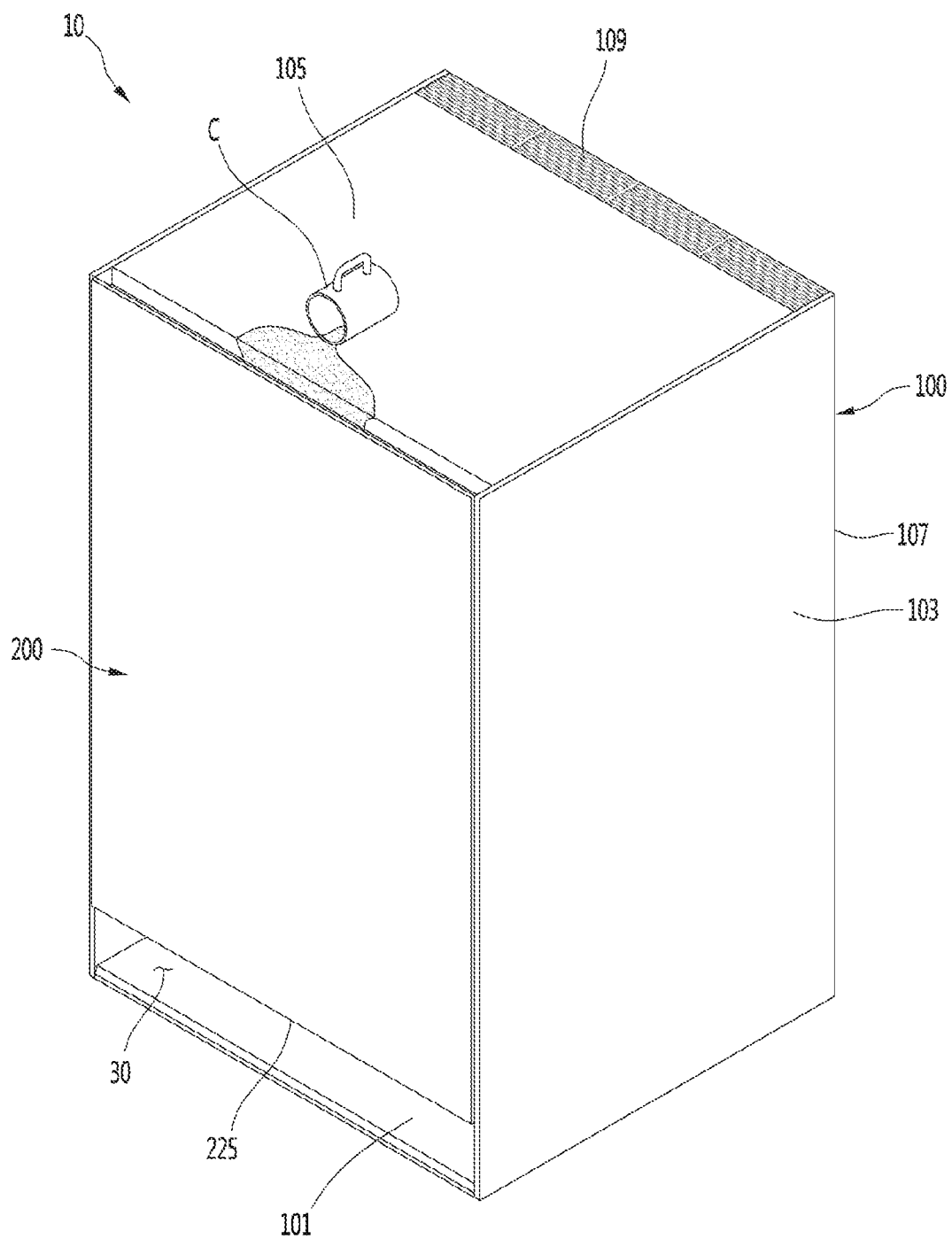
FIG. 29 is a view illustrating a state where fluid flows into a lower side of an upper panel according to an embodiment of the present invention.
Figure 30:
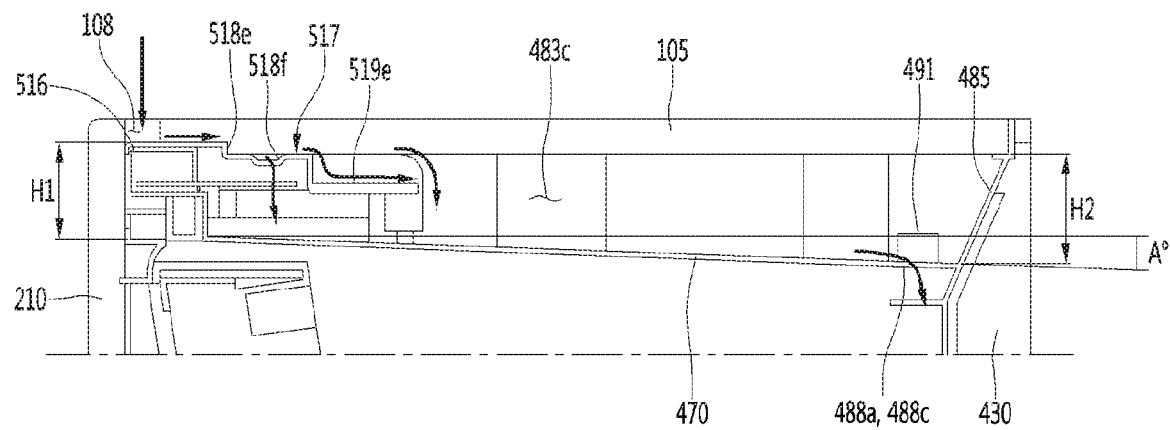
FIG. 30 is a view illustrating an inner drainage flow path in the air purifier according to an embodiment of the present invention.

FIG. 29 is a view illustrating a state where fluid flows into a lower side of an upper panel according to an embodiment of the present invention, and FIG. 30 is a view illustrating an inner drainage flow path in the air purifier according to an embodiment of the present invention.

FIG. 29 illustrates a state in which the user drops the cup C placed on the upper panel 105 of the air purifier 10 and the fluid flows to the lower side of the upper panel 105. Particularly, the fluid may flow into the electric unit 450 side through the display groove 108. When the fluid flows into the electric unit 450 side and acts on the electric component, it may cause failure of the air purifier. Therefore, a fluid drainage structure is required.

Referring to FIG. 30, the electric base 470 may be formed to be inclined downward toward the rear side by a set angle A°. In detail, the vertical height H1 of the front supporter 481 is formed to be greater than the vertical height H2 of the rear supporter 485. The side supporter 483 is formed such that the length thereof in the vertical direction gradually increases from the front end to the rear end.

In other words, the electric base 470 may be configured such that the front end of the electric base 470 is positioned higher than the rear end of the electric base 470.

The electric base 470 may be arranged to be inclined downward to the rear side, and the height of the uppermost end of the base supporter 480 may be the same. That is, the uppermost heights of the front supporter 481, the side supporter 483, and the rear supporter 485 are equal to each other. Accordingly, the upper panel 105 can be stably arranged horizontally above the electric plate 450.

The fluid which has flowed into the front portion 450 may drop toward the first top cover 518a or the second top cover 519a of the display cover 517, may flow downward along the first and second steps 518e and 518f, may flow into the cover passage 518g, and may be discharged to the outside.

Then, some of the fluid may flow downward along the recessed surface of the second dent 519e. The fluid flowing downward may fall on the upper surface of the electric base 470.

The fluid which is present on the upper surface of the electric base 470 may be moved backward along the upper surface of the electric base 470 inclined downward to the rear side and may flow through the first drain port 488a or the second drain port 488c to the outside of the electric base 470. Then, a part of the fluid can be drained through the wire passage hole 483a.

The water discharged from the electric base 470 may flow downward and from the side surface of the body frame 110 and fall along the drain passage 111c. Then, the discharged water may be finally collected in the base 101 of the humidifying air purifier 10.

According to this configuration, even if water is poured into the humidifying air purifier 10, the water flowing into the humidifying air purifier 10 can be prevented from penetrating into the electric component, and the introduced water can be effectively drained to the outside of the electric unit while being naturally moved backward.

Even though all the elements of the embodiments are coupled into one or operated in the combined state, the present disclosure is not limited to such an embodiment. In other words, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. An air purifier comprising:
    a cabinet in which an air blowing fan s provided in an inner space, the cabinet having an open front so as to communicate with the inner space;
    a door having:
        a front surface opening and closing the open front of the cabinet; and
        a bottom surface forming an air intake, the door being slidably drawn out from or slidably inserted in the cabinet by a rail assembly;
    a filter assembly accommodated in the door so as to be disposed behind the air intake;
    a display groove recessed downwardly between an upper surface of the door and an upper surface of the cabinet in a state in which the door is disposed to be inserted into the cabinet, wherein a step is formed at a front end of the upper surface of the cabinet to form a display groove; and
    a display module positioned to define a bottom surface of the display groove and exposed upwardly through the display groove,
    wherein the display module is supported by an elastic member so as to move and elastically return in an insertion direction of the door when the door is inserted into the cabinet.

2. The air purifier according to claim 1, wherein the display module includes a display provided with a user input menu.

3. The air purifier according to claim 1, further comprising:
    an upper panel forming the upper surface of the cabinet and spaced apart from the upper surface of the door;
    an electric plate installed inside the cabinet and positioned below the upper panel; and
    an air conditioned space formed below the electric plate, wherein the air blowing fan is disposed in the air conditioned space,
    wherein the display module is coupled to the electric plate, and
    wherein the electric plate includes:
        an electric base, wherein a plurality of electric components are installed on the electric base; and
        a base supporter extending upward along an edge of the electric base, the base supporter supporting the display module.

4. The air purifier according to claim 2, wherein the display is disposed along a front end of the electric base.

5. The air purifier according to claim 1, wherein the door is configured to be movable in a front and rear direction of the cabinet, and the display module is independently movable in the front and rear direction of the cabinet.

6. The air purifier according to claim 3, wherein the display module includes:
    a display mounting portion on which a display printed circuit board (PCB) is installed; and
    a display cover provided on an upper side of the display mounting portion.

7. The air purifier according to claim 6, wherein the display module further includes a guide protrusion protruding rearward from the display cover, and the guide protrusion is inserted into a guide rib protruding upward from the electric plate.

8. The air purifier according to claim 7, wherein the elastic member is a spring that is fitted into the guide protrusion, and one end of the spring is supported by the display cover, and the other end of the spring is supported by the guide rib.

9. The air purifier according to claim 6, wherein the display module further includes a guide slit formed in the display cover and extending in the front and rear directions, and a screw is inserted into the guide slit and fastened by a fastening boss provided on the electric plate.

10. The air purifier according to claim 1, wherein the display module is positioned in front of the upper surface of the cabinet.

11. The air purifier according to claim 1, wherein at least one of the upper surface of the cabinet and the front surface of the door is formed of wood.

12. The air purifier according to claim 3, further comprising:
    a damper assembly provided in the electric base so as to control a moving speed of the display module.

13. The air purifier according to claim 12, wherein the damper assembly is coupled to the display module, and when the display module is drawn out, the display module is decelerated to be drawn out at a predetermined speed by the damper assembly.

* * * * *